US007120558B2

United States Patent
McIntyre et al.

(10) Patent No.: US 7,120,558 B2
(45) Date of Patent: Oct. 10, 2006

(54) REMOTELY MONITORING/DIAGNOSING DISTRIBUTED COMPONENTS OF A SUPERVISORY PROCESS CONTROL AND MANUFACTURING INFORMATION APPLICATION FROM A CENTRAL LOCATION

(75) Inventors: James P. McIntyre, Aliso Viejo, CA (US); Kevin G. Rowley, San Marcos, CA (US); Derrick C. Jones, Santa Ana, CA (US); Pankaj H. Mody, Laguna Niguel, CA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 10/974,361

(22) Filed: Oct. 27, 2004

(65) Prior Publication Data

US 2005/0060408 A1 Mar. 17, 2005

Related U.S. Application Data

(63) Continuation of application No. 10/179,456, filed on Jun. 24, 2002, now Pat. No. 6,813,587.

(60) Provisional application No. 60/300,363, filed on Jun. 22, 2001, provisional application No. 60/300,174, filed on Jun. 22, 2001, provisional application No. 60/300,321, filed on Jun. 22, 2001.

(51) Int. Cl.
*G06F 15/00* (2006.01)
(52) U.S. Cl. .......................... 702/183; 702/1; 702/182; 702/184; 702/185; 702/189; 700/9
(58) Field of Classification Search ................ 702/183, 702/182, 184, 185, 189, 1; 700/28–30, 47–49, 700/3, 9
See application file for complete search history.

(56) References Cited

U.S. PATENT DOCUMENTS

| | | | |
|---|---|---|---|
| 4,910,691 A | 3/1990 | Skeirik |
| 5,006,992 A | 4/1991 | Skeirik |
| 5,134,574 A | 7/1992 | Beaverstock et al. |
| 5,371,895 A | 12/1994 | Bristol |
| 5,392,208 A | 2/1995 | Takita et al. |
| 5,652,884 A | 7/1997 | Palevich |
| 5,678,039 A | 10/1997 | Hinks et al. |
| 5,726,668 A | 3/1998 | Clement |
| 5,778,356 A | 7/1998 | Heiny |
| 5,838,563 A | 11/1998 | Dove et al. |

(Continued)

OTHER PUBLICATIONS

Copy of International Search Report, dated Feb. 11, 2003, in corresponding PCT Application No. PCT/US02/19862.

(Continued)

*Primary Examiner*—Marc S. Hoff
*Assistant Examiner*—Phuong Huynh
(74) *Attorney, Agent, or Firm*—Leydig, Voit & Mayer, LTD

(57) ABSTRACT

A centralized diagnostics management tool is disclosed that facilitates centralized monitoring of distributed components of a supervisory process control and manufacturing information application. The centralized diagnostics management tool includes a diagnostics management console shell that is customized according to a set of software modules that interface to data sources to populate views supported by the console shell. The console shell includes a set of view templates including controls for manipulating graphically displayed representations of data rendered by the distributed components. The console shell also includes an interface for exchanging requests and data with an extensible set of software modules that provide data links to ones of the set of distributed components. The software modules also define the customizable portions of the view rendered by the console shell.

19 Claims, 17 Drawing Sheets

U.S. PATENT DOCUMENTS

| | | |
|---|---|---|
| 5,847,955 A | 12/1998 | Mitchell et al. |
| 5,854,930 A | 12/1998 | McLain, Jr. et al. |
| 5,890,158 A | 3/1999 | House et al. |
| 5,909,368 A | 6/1999 | Nixon et al. |
| 5,910,987 A | 6/1999 | Ginter et al. |
| 5,940,294 A | 8/1999 | Dove |
| 5,974,372 A | 10/1999 | Barnes et al. |
| 6,108,616 A | 8/2000 | Borchers et al. |
| 6,195,665 B1 | 2/2001 | Jarett |
| 6,201,996 B1 | 3/2001 | Crater et al. |
| 6,236,910 B1 | 5/2001 | Iwai et al. |
| 6,275,868 B1 | 8/2001 | Fraley et al. |
| 6,349,237 B1 | 2/2002 | Koren et al. |
| 6,353,923 B1 | 3/2002 | Bogle et al. |
| 6,418,450 B1 | 7/2002 | Daudenarde |
| 6,480,854 B1 | 11/2002 | Gross et al. |
| 6,624,388 B1 | 9/2003 | Blankenship et al. |
| 6,772,017 B1 | 8/2004 | Dove et al. |
| 6,853,920 B1 * | 2/2005 | Hsiung et al. ........... 702/1 |

OTHER PUBLICATIONS

Copy of International Search Report, dated Dec. 6, 2002, in corresponding PCT Application No. PCT/US02/20231.

* cited by examiner

FIG. 3

[Common Fields]

| # | Field |
|---|---|
| 300 | Scripts |
| 302 | UDA |
| 304 | Alarm Mode |
| 306 | Based On |
| 308 | AttributeNames |
| 310 | Contained Name |
| 312 | Deployed version |
| 314 | Derived from |
| 316 | Relative Execution Order |
| 318 | Hierarchial Name |
| 320 | IsTemplate |
| 322 | Alarm Inhibit |
| 324 | Alarm Mode |
| 326 | Alarm Mode Command |
| 328 | Area |
| 330 | Container |
| 332 | Category |
| 334 | Category Enum |
| 336 | Errors |
| 338 | Host |
| 340 | InAlarm |
| 342 | ScanState |
| 344 | ScanStateCommand |
| 346 | Security Group |
| 348 | Description |
| 350 | TagName |
| 352 | Warnings |

FIG. 4
[Platform Object Fields]

| | |
|---|---|
| 400 | RegisterEngine |
| 402 | StartEngine |
| 404 | StartHostedObjects |
| 406 | StopEngine |
| 408 | UnregisterEngine |
| 410 | Engines |
| 412 | EngineStates |

FIG. 5

| | |
|---|---|
| 500 | External Name |
| 502 | Internal Name |
| 504 | Reference Count |
| 506 | Objects |
| 508 | Startup Type |
| 510 | CanGoOnscan |
| 512 | BindReference |
| 514 | AutoRestart |
| 516 | CheckPointFailed |
| 518 | AlarmThrottleLimit |
| 520 | EngineAlarmRate |
| 522 | AlarmsThrottled |
| 524 | ScriptExecuteTimeout |
| 526 | ScriptStartupTimeout |
| 528 | ScriptShutdownTimeout |
| 530 | PublisherHeartbeat |
| 532 | ProcessId |
| 534 | CreateAutomationObject |
| 536 | DeleteAutomationObject |
| 538 | StartHostedObjects |

FIG. 6

| # | Field |
|---|---|
| 600 | External Name |
| 602 | Internal Name |
| 604 | StatsAvgPeriod |
| 606 | CheckpointPeriodAvg |
| 608 | ExecutionTimeAvg |
| 610 | HousekeepingTimeAvg |
| 612 | TimeIdleAvg |
| 614 | TimeIdleMax |
| 616 | TimeIdleMin |
| 618 | InputMsgSizeAvg |
| 620 | InputMsgsProcessedAvg |
| 622 | InputMsgsQueuedAvg |
| 624 | InputMsgsQueuedMax |
| 626 | InputQueueSizeAllowed |
| 628 | InputQueueSizeAvg |
| 630 | InputQueueSizeMax |
| 632 | TimeInputAvg |
| 634 | ObjectCnt |
| 636 | ObjectsOffScanCnt |
| 638 | TimeOutputAvg |
| 640 | StatsReset |
| 642 | ScanCyclesCnt |
| 644 | ScanOverrunsCnt |
| 646 | ScanOverrunsConsecutiveCnt |
| 648 | ScanOverrunHighLimit |
| 650 | ScanOverrunCondition |
| 652 | ScanPeriod |

FIG. 7
[Analog Device Application Object Fields]

| # | Field |
|---|---|
| 700 | AnalogDevice Attributes |
| 701 | PV.Input |
| 702 | PV. Output |
| 703 | Scaling |
| 704 | LevelAlarms |
| 705 | PV.Roc |
| 706 | SP |
| 707 | PVDev |
| 708 | CtrlTrack |

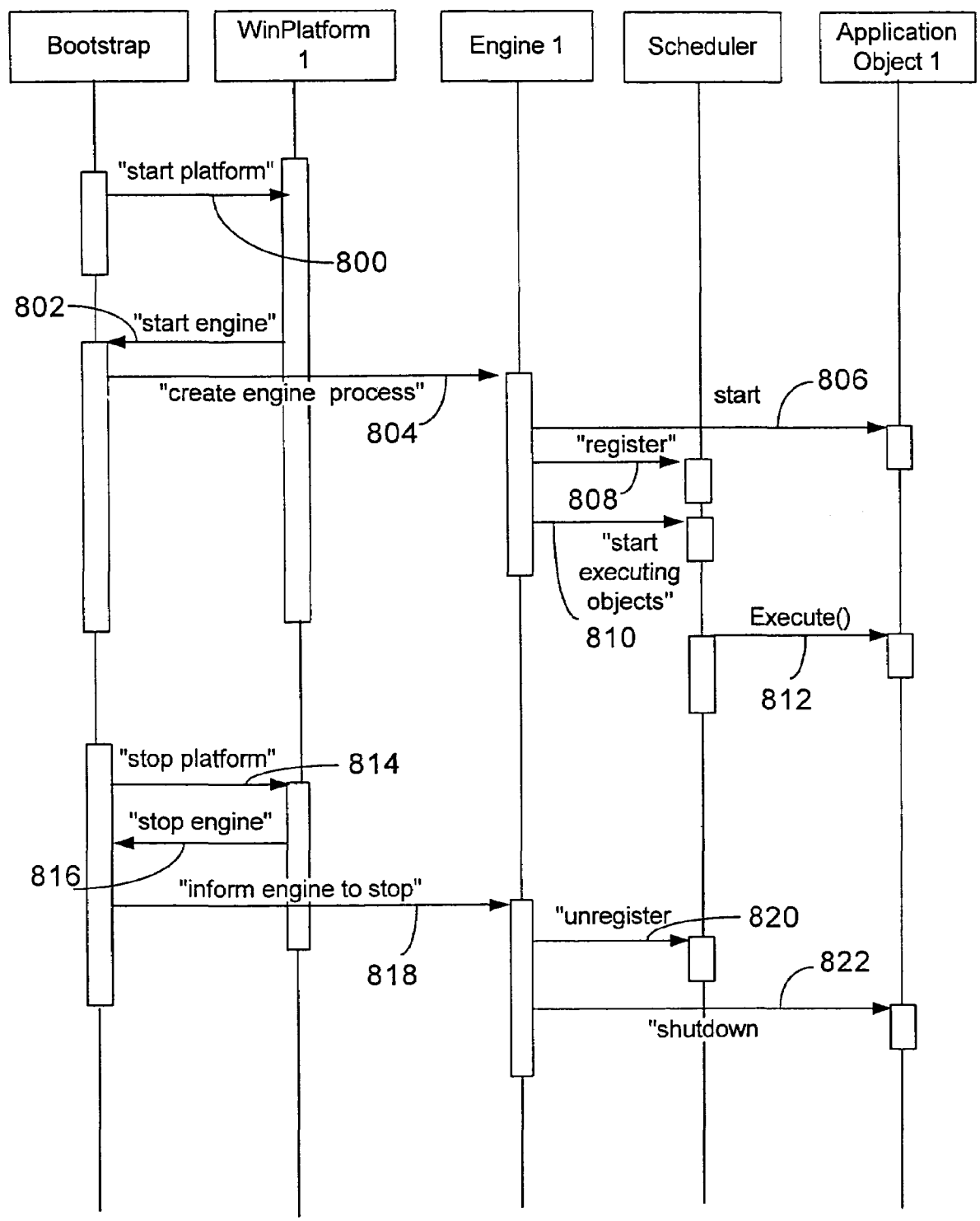

Area (Model)

Derivation (App. Objects)

Model (Compound Containment)

Physical Hardware Derivation View

Application Model View

Deployment View

REMOTELY MONITORING/DIAGNOSING DISTRIBUTED COMPONENTS OF A SUPERVISORY PROCESS CONTROL AND MANUFACTURING INFORMATION APPLICATION FROM A CENTRAL LOCATION

CROSS REFERENCE TO RELATED APPLICATIONS

This application is a continuation of, and claims priority of, U.S. patent application Ser. No. 10/179,456, filed on Jun. 24, 2002, now U.S. Pat. No. 6,813,587 for "Remotely Monitoring/Diagnosing Distributed Components Of A Supervisory Process Control And Manufacturing Information Application From A Central Location," which in turn claims priority of Resnick et al. U.S. provisional application Ser. No. 60/300,363 filed on Jun. 22, 2001, entitled "An Object-based Architecture for Executing Supervisory Process Control and Manufacturing Applications," Rowley et al. U.S. provisional application Ser. No. 60/300,174 filed on Jun. 22, 2001, entitled "Method for Installing Supervisory Process Control and Manufacturing Information System Software From a Remote Location and Dynamic Re-Binding Handles," and McIntyre et al. U.S. provisional application Ser. No. 60/300,321 filed on Jun. 22, 2001, entitled "Centralized Diagnostics In a Supervisory Process Control and Manufacturing Information Application Environment." The contents of each above identified provisional application are expressly incorporated herein by reference in their entirety including the contents and teachings of any references contained therein.

This application is related to copending U.S. patent application Ser. No. 10/179,668 by Resnick et al., entitled "Supervisory Process Control and Manufacturing Information System Application Having a Layered Architecture," filed on Jun. 24, 2002.

This application is related to copending U.S. patent application Ser. No. 10/179,763 by Resnick et al., entitled "Supervisory Process Control And Manufacturing Information System Application Having An Extensible Component Model," filed on Jun. 24, 2002.

This application is related to copending U.S. patent application Ser. No. 10/179,133, by Resnick et al., entitled "A Customizable System For Creating Supervisory Process Control And Manufacturing Information Applications," filed on Jun. 24, 2002.

This application is related to copending U.S. patent application Ser. No. 10/179,095, by Resnick et al., entitled "Security Architecture For A Process Control Platform Executing Applications," filed on Jun. 24, 2002.

This application is related to copending U.S. patent application Ser. No. 10/179,097, by Resnick et al., entitled "Internationalization Of Objects Executable In A Supervisory process Control And Manufacturing Information System," filed on Jun. 24, 2002.

This application is related to copending U.S. patent application Ser. No. 10/179,624, by Greg C. Clinton., entitled "Process Control Script Development And Execution Facility Supporting Multiple User-side Programming Languages," filed on Jun. 24, 2002.

This application is related to copending U.S. patent application Ser. No. 10/179,455, by Rowley et al., entitled "Installing Supervisory Process Control And Manufacturing Software From A Remote Location And Maintaining Configuration Data Links In a Run-Time Environment," filed on Jun. 24, 2002.

FIELD OF THE INVENTION

The present invention generally relates to the field of computerized process control networks. More particularly, the present invention relates to supervisory process control and manufacturing information systems. Such systems generally execute above a control layer in a process control network to provide guidance to lower level control elements and/or field devices such as, by way of example, programmable logic controllers.

BACKGROUND OF THE INVENTION

Significant advances in industrial process control technology have vastly improved all aspects of factory and plant operation. Before the introduction of today's modern industrial process control systems, industrial processes were operated/controlled by humans and rudimentary mechanical controls. As a consequence, the complexity and degree of control over a process was limited by the speed with which one or more people could ascertain a present status of various process state variables, compare the current status to a desired operating level, calculate a corrective action (if needed), and implement a change to a control point to affect a change to a state variable.

Improvements to process control technology have enabled vastly larger and more complex industrial processes to be controlled via programmed control processors. Control processors execute control programs that read process status variables, execute control algorithms based upon the status variable data and desired set point information to render output values for the control points in industrial processes. Such control processors and programs support a substantially self-running industrial process (once set points are established).

Notwithstanding the ability of industrial processes to operate under the control of programmed process controllers at previously established set points without intervention, supervisory control and monitoring of control processors and their associated processes is desirable. Such oversight is provided by both humans and higher-level control programs at an application/human interface layer of a multilevel process control network. Such oversight is generally desired to verify proper execution of the controlled process under the lower-level process controllers and to configure the set points of the controlled process.

One of many challenges facing the designers/managers of often highly complex, distributed process control systems is to properly load/maintain required software onto each one of a plurality of supervisory-level computers executing a portion of a distributed application. A challenge faced by the managers of such systems is the potentially significant distances between the various computer devices (e.g., personal computers) executing the various portions of the distributed supervisory process control application. Another challenge to the software loading process is the sheer volume of executables that are transferred to the distributed computer devices. Yet another complication is the potential existence, in cases where a service pack is to be deployed, of previously installed components on the target personal computer systems.

Keeping track of the operation of individual distributed components on an application loaded upon computers located throughout an industrial plant is another challenge faced by system administrators. Known systems provide centralized alarm capabilities that are monitored in a central control room. However, even when alarm conditions are not met, an administrator still has an interest in determining how installed application objects are performing on a distributed system, and to take remedial action if needed.

SUMMARY OF THE INVENTION

In accordance with the invention, a centralized diagnostics management tool facilitates centralized monitoring of distributed components of a supervisory process control and manufacturing information application. The centralized diagnostics management tool includes a diagnostics management console shell that is customized according to a set of software modules that interface to data sources to populate views supported by the console shell. The console shell includes a set of view templates including controls for manipulating graphically displayed representations of data rendered by the distributed components. The console shell also includes an interface for exchanging requests and data with an extensible set of software modules that provide data links to ones of the set of distributed components. The personality of the interface is driven by a set of software modules that submit requests to the distributed components to access exposed attributes corresponding to the operational statuses of the components. The software modules also define the customizable portions of the view rendered by the console shell.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 3 depicts a set of attributes associated with a common portion for the objects comprising the application;

FIG. 4 depicts a set of attributes associated with a platform-specific portion of a platform object;

FIG. 5 depicts a set of attributes associated with an engine object;

FIG. 6 depicts a set of attributes associated with a scheduler object;

FIG. 7 depicts a set of attributes associated with an exemplary application object;

FIG. 8 is a sequence diagram summarizing a set of steps performed to start up a multi-layered application embodying the present invention;

DETAILED DESCRIPTION OF AN ILLUSTRATIVE EMBODIMENT

Figure 1:
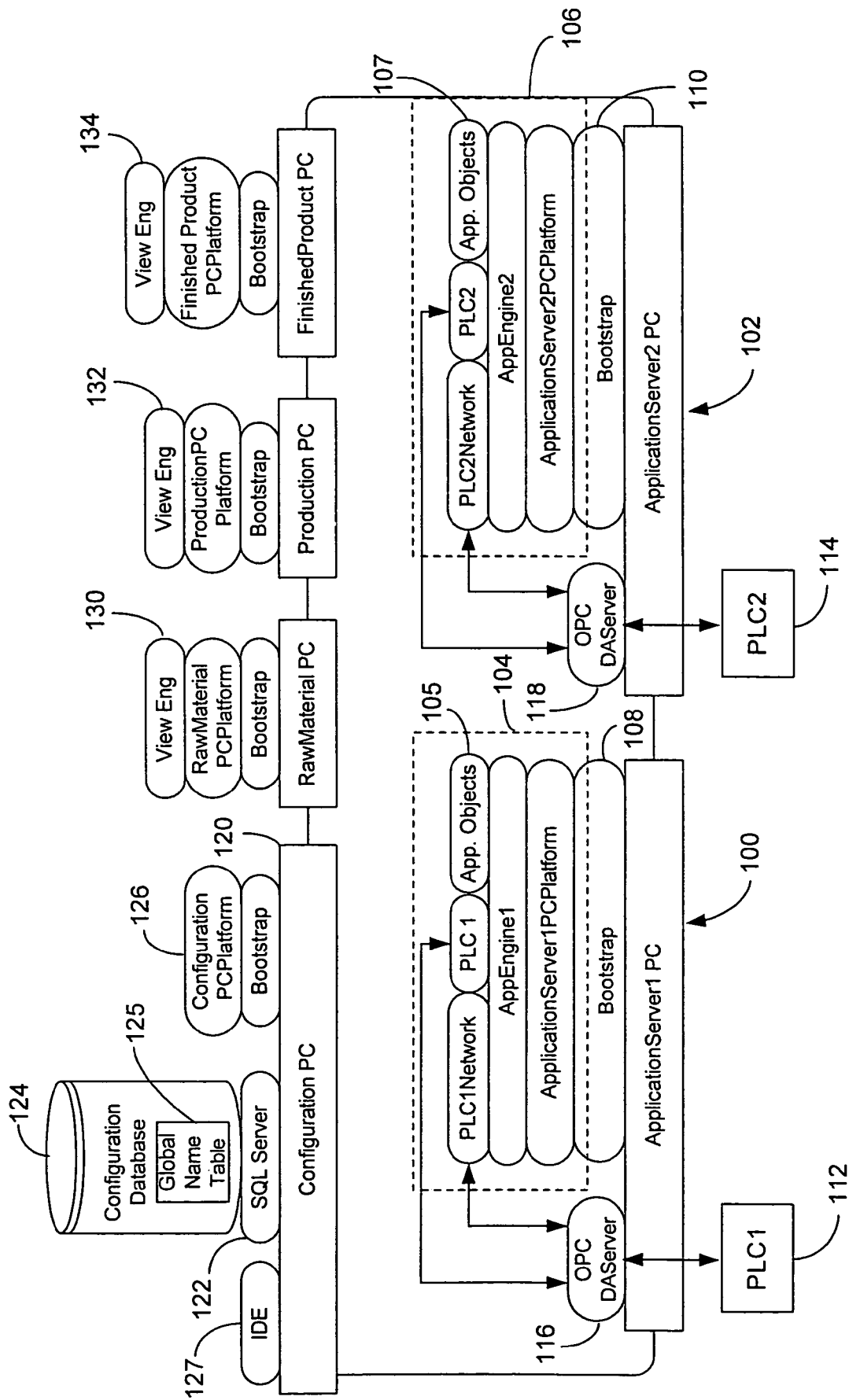
FIG. 1 is a schematic diagram of an exemplary supervisory process control network including a multi-layered supervisory process control and manufacturing information application.

In view of the shortcomings of known supervisory process control applications with regard to adapting to changed process control system architectures, a supervisory process control and manufacturing information system application architecture is described that offers users the freedom to re-architect (e.g., augment, reconfigure, etc.) such applications, with minimal impact on the existing, underlying, process control system engineering. In particular, the disclosed system architecture, described by way of example herein, comprises multiple layers wherein each underlying layer exhibits a hosting relationship to a next higher layer. It is noted however, that such hosting relationship does not extend to communications, and thus communications to/from a hosted layer need not pass through its host. In accordance with the disclosed layered application architecture, an application object is hosted by an engine. The engine is hosted by a platform that corresponds to, for example, a personal computer with infrastructure software. The intermediate engine layer abstracts the application object from the platform architecture. Thus, location within a physical system containing the application object need not be addressed by the application object.

One aspect of the disclosed supervisory process control and manufacturing information application is an object hierarchy that frees high level application objects of design constraints associated with the computing system hardware upon which the application objects reside. In particular, the objects associated with a supervisory process control application environment are arranged on physical computing devices in a hierarchy comprising a plurality of layers. Application objects execute at an application layer. The application objects are hosted by an engine object at a middle layer. The engine objects are hosted by a platform object that resides at the lowest of the three layers. Each platform object, launched by a bootstrap object at yet an even lower layer. The platform object corresponds a physical computing system (including an operating system) upon which application and engine objects execute. Thus, application objects need only establish a proper, standardized, relationship to a hosting application engine object. Aspects of the supervisory control and manufacturing information system relating to physical computing devices and their operating systems are handled by the engine and platform object configuration. The physical topology of the system and the application's physical location is transparent to the operation of the application objects.

The disclosed layered hosting arrangement of object enables a supervisory process control application to be modeled independently of the computing hardware and supervisory control network topology, upon which the application executes. Isolating the application model from the physical deployment configuration enables migrating applications to new/different computing systems as the need arises and to keep up with underlying hardware changes over the course of the life of the application. Such capabilities are especially beneficial in the area of process control and manufacturing information systems where pilot installations are used to provide proof of concept and then the application grows as, and when, it is justified.

The application model includes groupings of application objects within logical containers referred to as "areas." All application objects within a same area must be deployed upon a same application engine according to a software deployment scheme. However, the layered application architecture enables binding an application model to a particular deployment model at a late stage in development. Thus, an abstract "area" need not be associated with a particular engine until a developer is ready to deploy and execute a supervisory-level system.

The security model for a supervisory control and manufacturing information system is independent of the physical hardware, and thus a supervisory process control and manufacturing information system architect need not bind security to a particular physical system component until the application modules have been deployed within a physical system containing the physical system component. The late binding of security to particular components of a system enables a developer to determine the authorization of a particular system based upon the deployed application objects, and the developer binds security based upon the functionality of the application objects deployed upon particular computing nodes.

Furthermore, disassociating the functionality (business logic) provided by the application objects from the computer systems upon which the execute enables presenting the defined system/software configuration according to a plurality of views/models. A "plant centric" application model enables a system developer to build an application model in a logical way. The system developer defines the individual devices and functions as distinct entities within a plant. All associated functionality is contained in each object. After defining the individual objects within the plant, the user configures (assembles) associations between the objects.

The application model is a logical build of the plant relative to physical areas of the plant and the equipment and functions within the physical areas. The engineer configures the behavior and association between these plant area entities. The supervisory process control and manufacturing information system provides a configuration view of the application model depicting a containment hierarchy with relation to: the areas and equipment, and the equipment itself.

The application model supports containing objects within objects, and containment can be specified in a template. Containment facilitates leveraging the work of different engineers at different levels of development of a supervisory process control and manufacturing information application. A particular technician can define the details for a particular low level device. Thereafter another engineer defines a unit or other device in the application that contains one or more instances of the particular low level device.

The application model also supports propagating changes through inheritance. Thus, child objects inherit changes to a referenced parent template definition.

After a developer specifies the functionality of a process control and manufacturing information application, the application is deployed across potentially many physical computing systems. In an embodiment of the invention disclosed herein, a second type of system view, referred to as a deployment model, enables a user to configure physical PCs and devices with regard to an application. The deployment model defines: PCs and engine types that run on the platforms, and external device integration. A user defines the areas that will run on particular engines, thereby determining where the particular application software will be physically executed. The supervisory process control and manufacturing information system provides a configuration view of a deployment model showing the hierarchy with physical PCs, and the areas and application objects running on the physical PCs. After a developer designates/confirms the deployment model, the application objects and engine objects are deployed on the physical computing devices according to the deployment model.

In accordance with an aspect of the disclosed embodiment of the present invention, software components are distributed to appropriate computers from a centralized location via a network. This reduces the workload placed upon engineers/network software maintenance personnel when configuring the software on the various computers that execute a distributed application. Furthermore, only the software required to complete an installation is transmitted (i.e., previously existing components are not sent to the remotely loaded computers). Finally, the configuration of the remote computers is checked against the requirements specified to carry out the deployed software.

Yet another aspect of an embodiment of the present invention is the ability of the object communication links to self-heal when an object is moved to a new location in the network. In such case, the name remains the same. As a consequence, the calling object consults a name binding directory service that furnishes a new self-routing communications handle for the moved object. To application objects, that address objects on a name basis, the move of the called object is transparent.

Still yet another aspect of the disclosed embodiment of the present invention is the use of the messaging capabilities of the system to provide attribute data access via a set of snap in software modules to a central diagnostic facility including a graphical display interface. In an exemplary embodiment of the invention disclosed herein below, the diagnostics in the supervisory process control and manufacturing information system are centralized through the use of a GUI-based management shell and an extensible set of snap-in software modules that retrieve diagnostic information from remotely located sources of diagnostic data. Thus, a user is capable of gaining access to the distributed diagnostic data within a system by calling up a single application (e.g. a Systems Management Console or "SMC" described herein below).

The GUI-based management shell hosts an extensible set of snap in software modules relating to various diagnostic monitoring/management tasks. The particular "snap ins" search the network for applicable system objects and diagnostic data (attributes). The data is then presented to the management shell for presentation via the shell's graphical user interface.

Having summarized generally the new architecture for a supervisory process control and manufacturing information system facilitating re-configuring (re-architecting) the system, attention is directed to FIG. 1, comprising an illustrative example of a system incorporating an application architecture embodying the present invention. A first application server personal computer (PC) 100 and a second application server PC 102 collectively and cooperatively execute a distributed multi-layered supervisory process control and manufacturing information application comprising a first portion 104 and second portion 106. The application portions 104 and 106 include device integration application objects PLC1Network and PLC1, and PLC2Network and PLC2, respectively. The PLCxNetwork device integration objects facilitate configuration of a data access server (e.g., OPC DAServers 116 and 118). The PLC1 and PLC2 device integration objects, operating as OPC clients, access data locations within the buffers of the OPC DAServers 116 and 118. The data access servers 116 and 118 and the device integration objects cooperatively import and buffer data from external process control components such as PLCs or other field devices. The data buffers are accessed by a variety of application objects 105 and 107 executing upon the personal computers 100 and 102. Examples of application objects include, by way of example, discrete devices, analog devices, field references, etc.

In accordance with an embodiment of the present invention, application engines host the application objects (via a logical grouping object referred to herein as an "area". The engines are in turn hosted by platform objects at the next lower level of the supervisory process control and manufacturing information application. The application portions 104 and 106 are, in turn hosted by generic bootstrap components 108 and 110. All of the aforementioned components are described herein below with reference to FIG. 2.

In the exemplary system embodying the present invention, the multi-layered application comprising portions 104 and 106 is communicatively linked to a controlled process. In particular, the first application server personal computer 100 is communicatively coupled to a first programmable logic controller 112, and the second application server personal computer 102 is communicatively coupled to a second programmable logic controller 114. It is noted that the depicted connections from the PCs 100 and 102 to the PLCs 112 and 114 represent logical connections. Such logical connections correspond to both direct and indirect physical communication links. For example, in a particular embodiment, the PLC 112 and PLC 114 comprise nodes on an Ethernet LAN to which the personal computers 100 and 104 are also connected. In other embodiments, the PLCs 112 and 114 are linked directly to physical communication ports on the PCs 100 and 102.

In the illustrative embodiment set forth in FIG. 1, the PCs 100 and 102 execute data access servers 116 and 118 respectively. The data access servers 116 and 118 obtain/extract process information rendered by the PLC's 112 and 114 and provide the process information to application objects (e.g., PLC1Network, PLC1, PLC2Network, PLC2) of the application comprising portions 104 and 106. The data access servers 116 and 118 are, by way of example, OPC Servers. However, those skilled in the art will readily appreciate the wide variety of custom and standardized data formats/protocols that are potentially carried out by the data access servers 116 and 118. Furthermore, the exemplary application objects, through connections to the data access servers 116 and 118, represent a PLC network and the operation of the PLC itself. However, the application objects comprise a virtually limitless spectrum of classes of executable objects that perform desired supervisory control and data acquisition/integration functions in the context of the supervisory process control and manufacturing information application.

The supervisory process control and management information application is augmented, for example, by a configuration personal computer 120 that executes a database (e.g., SQL) server 122 that maintains a supervisory process control and management information application configuration database 124 for the application objects and other related information including templates from which the application objects are rendered. The configuration database 124 also includes a global name table 125 that facilitates binding location independent object names to location-derived handles facilitating routing messages between objects within the system depicted in FIG. 1. The configuration PC 120 and associated database server 122 support: administrative monitoring for a multi-user environment, revision history management, centralized license management, centralized object deployment including deployment and installation of new objects and their associated software, maintenance of the global name table 125, and importing/exporting object templates and instances.

Actual configuration of the applications is carried out via an Integrated Development Environment (IDE) 127 that communicates with the database server 122 via distributed component object model (DCOM) protocols. The IDE is a utility from which application objects are configured and deployed to the application server PCs 100 and 102. Developers of a supervisory process control and manufacturing information application, through the IDE, carry out a wide variety of system design functions including: importing new object and template types, configuring new templates from existing templates, defining new application objects, and deploying the application objects to the host application engines (AppEngine1 or AppEngine2 in FIG. 1) on the application server PCs 100 and 102.

The exemplary supervisory control network environment depicted in FIG. 1, also includes a set of operator stations 130, 132, and 134 that provide a view into a process or portion thereof, monitored/controlled by the supervisory process control and management information application installed and executing as a set of layered objects upon the PCs 100 and 102. A RawMaterial PC 130 provides a representative view enabling monitoring a raw materials area of a supervised industrial process. A ProductionPC 132 presents a representative view of a production portion of the supervised industrial process. A FinishedProductPC 134 provides a representative view of an area of a production facility associated with finished product. Each one of the operator stations 130, 132, and 134 includes a bootstrap host for each of the particular operator station platforms. Each one of the operator stations 130, 132, and 134 includes a view engine that process graphics information to render a graphical depiction of the observed industrial process or portion thereof.

It is noted that the system depicted in FIG. 1 and described hereinabove is merely an example of a multi-layered hierarchical architecture for a supervisory process control and manufacturing information system. The present invention is not limited to the particular disclosed application/system. For example it is contemplated that the multi-layered application approach is applicable, at a lower control level, to a distributed control system (DCS) application or a programmable logic controller (PLC) application. In these cases specific platform and application engine objects are developed for the unique computing hardware within the DCS or PLC. It is further noted that FIG. 1 is presented as a logical view of the interrelations between installed software and physical computing hardware and is not intended to designate any particular network topology. Rather the present invention is suitable for a virtually any network topology. In fact, the present invention is applicable to a control application running on a single computer system linked to a controlled process.

Figure 2:
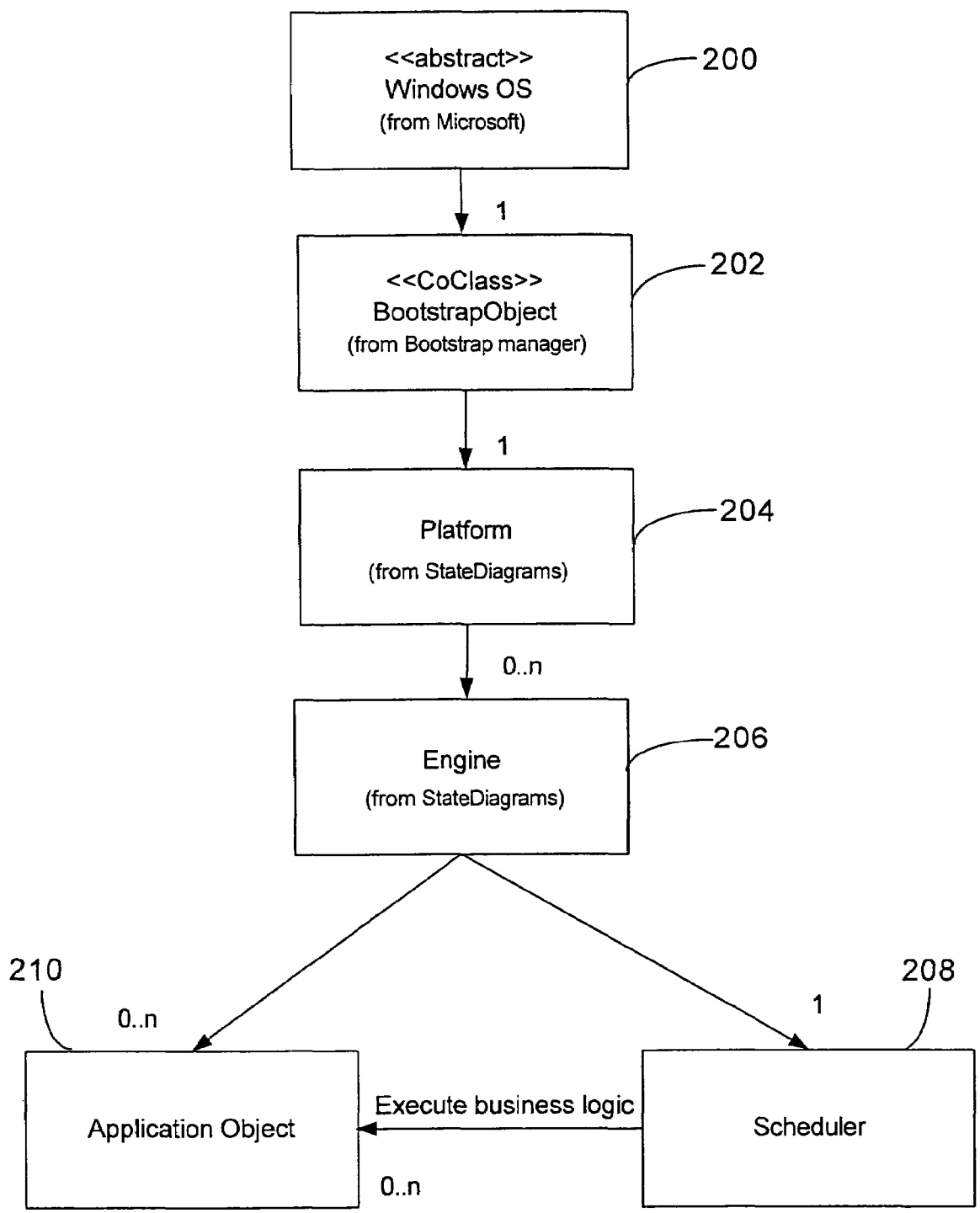
FIG. 2 depicts a multi-tiered object arrangement for an application.

Turning now to FIG. 2, a class diagram depicts the hierarchical arrangement of layered software associated with a computer executing at least of portion of a supervisory process control and manufacturing information application. Each computer executes an operating system 200, such as MICROSOFT's WINDOWS at a lowest level of the hierarchy. The operating system 200, hosts a bootstrap object 202. The bootstrap object 202 is loaded onto a computer and activated in association with startup procedures executed by the operating system 200. As the host of a platform class object 204, the bootstrap object 202 must be activated before initiating operation of the platform class object 204. The bootstrap object 202 starts and stops the platform class object. The bootstrap object 202 also renders services utilized by the platform class object 204 to start and stop one or more engine objects 206 hosted by the platform class object 204.

The platform class object 204 is host to one or more engine objects 206. In an embodiment of the invention, the platform class object 204 represents, to the one or more engine objects 206, a computer executing a particular operating system. The platform class object 204 maintains a list of the engine objects 206 deployed on the platform class object 204, starts and stops the engine objects 206, and restarts the engine objects 206 if they crash. The platform class object 204 monitors the running state of the engine objects 206 and publishes the state information to clients. The platform class object 204 includes a system management console diagnostic utility that enables performing diagnostic and administrative tasks on the computer system executing the platform class object 204. The platform class object 204 also provides alarms to a distributed alarm subsystem.

The engine objects 206 host a set of application objects 210 that implement supervisory process control and/or manufacturing information acquisition functions associated with an application. The engine objects 206 initiate startup of all application objects 210. The engine objects 206 also schedule execution of the application objects 210 with regard to one another with the help of a scheduler object. Engines register application objects with a scheduler for execution. The scheduler executes the application objects relative to other application objects based upon the configuration specified by an engine. The engine objects 206 monitor the operation of the application objects 210 and place malfunctioning ones in a quarantined state. The engine objects 206 support check pointing by saving/restoring changes to a runtime application made by automation objects to a configuration file. The engine objects 206 maintain a name binding service that bind attribute references (e.g., tank1.value.pv) to a proper one of the application objects 210.

The engine objects 206 ultimately control how execution of application objects will occur. However, once the engine objects 206 determine execution scheduling for application objects 210, the real-time scheduling of their execution is controlled by a scheduler 208. The scheduler supports an interface containing the methods RegisterAutomationObject( ) and UnregisterAutomationObject( ) enabling engine objects 206 to add/remove particular application objects to/from the schedulers list of scheduled operations.

The application objects 210 include a wide variety of objects that execute business logic facilitating carrying out a particular process control operation (e.g., turning a pump on, actuating a valve), and/or information gathering/management function (e.g., raising an alarm based upon a received field device output signal value) in the context of, for example, an industrial process control system. Examples of application objects include: analog input, discrete device, and PID loop. A class of application objects 210, act upon data supplied by process control systems, such as PLCs, via device integration objects (e.g., OPC DAServer 118). The function of the integration objects is to provide a bridge between process control/manufacturing information sources and the supervisory process control and manufacturing information application.

The application objects 210, in an exemplary embodiment, include an application interface accessed by engine objects and schedulers. The engine objects access the application object interface to: initialize an application object, startup an application object, and shutdown an application object. The schedulers use the application object interface to initiate a scheduled execution of the application object.

Having described the primary components of the hierarchically arranged supervisory process control and manufacturing information application, attention is now directed to FIGS. 3–7 that identify attributes of primitives that make up the above-described object structures. Turning first to FIG. 3 depicts a common object primitive definition. The common primitive is incorporated into all the application objects (i.e., platform, application engine, scheduler, application, etc.). A scripts attribute 300 is used to keep track of scripts that are associated with an application object. The scripts attribute 300 includes scripts inherited from templates as well as scripts created specifically for the particular object type. A UDA (user defined attribute) attribute 302 references inherited and new user defined attributes for an object. An alarm mode attribute 304 indicates whether an alarm is enabled and the extent to which it is enabled. A based on attribute 306 identifies a particular base template from which an object was derived. Attribute 308 stores a string identifying attribute names in an object. A contained name attribute 310 identifies the name assigned to an object within a container. For example, an object may correspond to a "level" contained within a "reactor" object. A deployed version attribute 312 stores an integer identifying a version for a deployed object. A derived from attribute 314 identifies the actual template from which an object was derived. The contents of the derived from attribute 314 differ from the contents of the based on attribute 306. The based on attribute 306 is the base template from which this object was derived from. The derived attribute 314 is the immediate template from which this object was created. For example for a hierarchy of templates as follows:

$DiscreteDevice
  $Pump
    Pump001

$DiscreteDevice is the base template from which a new template $Pump is derived. An instance Pump001 is created from the template $Pump. The attribute "derived from" for object Pump001 will be $Pump. The attribute "based on" for object Pump001 will be $DiscreteDevice.

A relative execution order attribute 316 identifies another object with which a present object has a relative execution order relation. In addition to identifying another object, attribute 316 identifies the relative order of execution of the objects (e.g., none, before, after, etc.). The relative execution order information is utilized to schedule execution of application objects. A hierarchical name attribute 318 stores a full name for an object including any of the containers of the object (e.g., Reactor1.level). An IsTemplate attribute 320 indicates whether the object is a template or an object instantiated from a template. An AlarmInhibit attribute 322 within an area or container object provides cutout functionality to inhibit alarms for all objects within an area or container. An alarm mode attribute 324 specifies the current alarm mode of an object. The mode is based upon the object's commanded mode if area and container are enabled. Otherwise, the most disabled state of the container or parent area applies. Alarm Mode Command attribute 326 specifies the object's currently commanded alarm mode.

The illustrative example of the present invention supports an object hierarchy. Objects specify such hierarchy in the context of a plant/model view in an area attribute 328 that specifies an area to which an object belongs. A container attribute 330 specifies a container that contains the object. As previously explained, a hosting relationship exists among various deployed objects. In particular, a platform hosts an engine, and an engine (via an area) hosts application objects. Thus, a host attribute 338 identifies an object's host.

A category attribute 332 specifies a class of objects with which the object is associated, thereby facilitating organizing objects according to local associations and/or functionality. The value is one of the categories named in a category enumeration attribute 334. An error attribute 336 identifies errors generated by the object. An InAlarm flag 340 stores a Boolean flag indicating whether an alarm exists in an object. The flag is true only if a Scan State flag 342 is true (the object is on scan) and the object's alarms are enabled. The scan state of an object is changed through a Scan State Command 344 that signals whether to take the object on/off scan.

A security group 346 enables designating a particular security group for the object to limit access/use of the object to particular classes of users. A description attribute 348 provides an area to store a short description of an object. A tag name attribute 350 specifies a unique tag for an object. A warnings attribute 352 lists any warnings rendered by an object.

Having described the common attributes of all objects described herein, a set of object type-specific attributes are described herein below beginning with attributes for a platform primitive with reference to FIG. 4. The attributes identified in FIG. 4 relate to supporting the object/engine/platform hosting hierarchy. While not identified in FIG. 4, a set of attributes are provided through the platform primitive enabling platform objects to monitor/report computer device statistics. Other attributes included in the exemplary platform primitive, but not included in FIG. 4, concern detecting and reporting alarms associated with computer device statistics and storing the statistics.

A RegisterEngine attribute 400 stores a command to register a new engine. The RegisterEngine attribute 400 is used at deployment time to register an engine with a host platform. A StartEngine attribute 402 stores a command to start a particular deployed engine on the platform. A StartHostedObjects attribute 404 stores a command passed to the platform to start all hosted engines that are start auto and start semi-auto type engines. A StopEngine attribute 406 stores a command to stop a particular deployed engine on the platform. An UnRegisterEngine attribute 308 stores a command to un-deploy a previously deployed engine on the platform. An Engines attribute 410 stores a list of all engines deployed on the platform. An EngineStates attribute 412 stores a list of the current operational states of all engine objects hosted by the platform.

FIG. 5 summarizes a set of attributes associated with an engine primitive. An external name attribute 500 stores a string used for external reference. An internal name attribute 502 stores a string used for internal reference. A reference count attribute 504 stores the number of objects referencing the engine object. When the number of references reaches zero, there are no clients, external to the engine, referencing any automation object attributes on the engine. This helps operators determine the impact (how many clients will be affected) of stopping the engine. An object attribute 506 is an array comprising a set of all objects hosted by the engine object. A startup type attribute 508 identifies how an engine object will be started (e.g., automatic, semi-automatic, manual). A CanGoOnscan attribute 510 indicates whether an engine object can be placed on-scan. A BindReference attribute 512 is a command used to resolve references (e.g., pump001.inlet.PV) to handles. These handles are used to locate objects at runtime by the messaging infrastructure. An AutoRestart attribute 514 stores a Boolean value indicating whether the engine object should be automatically restarted upon detection of a failure. A CheckpointFailedAlarm attribute 516 stores a value indicating whether a last attempt to checkpoint hosted objects had failed during a last attempt. An AlarmThrottleLimit attribute 518 stores a value, in alarms per second raised by an engine object before throttling of alarms generated by objects on the engine will occur. An EngineAlarmRate attribute 520 indicates the number of alarms registered on an engine during a last complete scan. An AlarmsThrottled attribute 522 indicates that an engine object throttled alarms during the last scan.

A set of attributes is provided to handle script execution. A ScriptExecuteTimout attribute 524 stores a time limit for a synchronous script to complete execution before an alarm is raised by an engine object. A ScriptStartupTimeout attribute 526 stores a time limit for a synchronous script to startup before an alarm will be raised. A ScriptShutdownTimout attribute 528 stores a time limit for a synchronous script to shutdown before an alarm will be raised. A PublisherHeartbeat attribute 530 stores a value corresponding to the number of seconds an engine object will wait for a heartbeat message from another engine object before it assumes the engine has failed. A Process ID 532 identifies a unique identification assigned to an engine process.

An engine object also contains a set of command attributes associated with managing application objects. A CreateAutomationObject attribute 534 is a command attribute for creating an application object. A DeleteAutomationObject attribute 536 is a command attribute for deleting an application object. A StartHostedObjects attribute 538 is a command attribute for starting hosted application objects.

Turning to FIG. 6, a set of attributes is summarized that are contained within a scheduler primitive and are unique to a scheduler object. Each scheduler object includes internal and external name attributes 600 and 602. A StatsAvgPeriod 604 stores a value representing the averaging period for the scheduler acquiring statistics stored within the attributes described herein below. A CheckpointPeriodAvg attribute 606 identifies the current average of times between checkpoints during the current averaging period. An ExecutionTimeAvg attribute 608 stores a value representing the amount of time to execute all the objects per scan cycle. A HousekeepingTimeAvg attribute 610 stores a value corresponding to the average time per cycle to complete housekeeping operations. A TimeIdleAvg attribute 612 stores a value representing the average idle time per period. A TimeIdleMax attribute 614 stores a value representing the maximum idle time recorded. A TimeIdleMin attribute 616 stores a value representing the minimum idle time recorded. An InputMsgSizeAvg attribute 618 stores an average input message size over the averaging period. An InputMsgsProcessedAvg attribute 620 stores a value representing the total volume of messages processed, in bytes, per scan cycle during the averaging period. An InputMsgsQueuedAvg attribute 622 stores the average number of messages queued per scan cycle during the averaging period. An InputMsgsQueuedMax attribute 624 stores the maximum average stored in attribute 622 since the last time the statistics attributes were reset.

An InputQueueSizeMaxAllowed attribute 626 stores the maximum allowed size of queued messages in a network message exchange input queue. An InputQueueSizeAvg attribute 628 stores an average size of the input queue in bytes during the averaging period. An InputQueueSizeMax attribute 630 stores the maximum average stored in attribute 628 since the last time the statistical attributes were reset.

A TimeInputAvg attribute 632 stores a value representing the average time required, during the current period, to process an input message. An ObjectCnt attribute 634 stores a count value corresponding to the current number of application objects currently being handled by a scheduler object. An ObjectsOffScanCnt attribute 636 indicates the number of application objects that are currently off-scan. A TimeOutputAvg attribute 638 stores an average amount of time required to process output message during a cycle. A StatsReset attribute 640 indicates an request to reset the statistical attributes described for the scheduler that are not regularly reset (e.g., maximum values). A ScanCyclesCnt attribute 642 stores a value indicating the number of cycles since a last resetting of the attributes through the StatsReset attribute 640. A ScanOverrunsCnt attribute 644 indicates the number of times, since a last StatsReset, that a scan cycle ended without completing a scan of all objects. A ScanOverrunsConsecutiveCount 646 stores a current number of consecutive cycles where an overrun occurs. A ScanOverrunHighLimit attribute 648 stores a high alarm limit for consecutive overruns to trigger an alarm stored in a ScanOverrunCondition attribute 650. A ScanPeriod 652 stores a value representing the cycle time for the scheduler.

It is noted that the attributes associated with particular object types are not limited to the particular object primitive types. In fact, all object types comprise at least two of the above-described primitives. All object types utilize the common object primitive. In addition, a platform object includes the attributes of the scheduler, engine and platform primitives described above. An engine object includes the attributes of the scheduler, and the engine primitives.

Turning to FIG. 7, a set of primitives is associated with an application object. Each type of application object has its own set of primitives. The primitives contain the business specific logic and the set of attributes that are unique to the function of the primitives. These primitives can be reused across different application object types.

An exemplary set of primitives associated with an analog device application object is depicted in FIG. 7. A primitive 700 labeled AnalogDevice attributes contains a set of analog device specific attributes in which clients would be interested. A PV.Input 701 is a primitive that reads, via a device integration object (e.g., PLC1), the data from a field device. A PV.Output 702 is a primitive that writes, via a device integration object, data to the field. A Scaling 703 is a primitive that performs linear or square root scaling of the data read from the input primitive (PV.Input 701). A LevelAlarms 704 is a primitive that generates alarms if a process variable in the AnalogDevice primitive 700 exceeds or is below configured values. A PV.RoC 705 is a primitive that generates alarms if a PV increases or decreases faster than a preset limit. A SP 706 is a primitive that clients write to when they want to modify the value to which the PV.Output 702 writes. A PVDev 707 is a primitive that is used to generate an alarm if a value read in from a field device (via primitive 701) deviates from a value written to the field device (via primitive 702) by a certain amount. A CtrlTrack 708 is a primitive that is used to enable the setpoint and PV primitives to track changes driven from the external device.

Having described the basic building blocks of an supervisory process control and manufacturing information application embodying the present invention, attention is directed to a set of sequence diagrams that summarize methods employed to carry out such an application. Turning to FIG. 8, a sequence diagram depicts steps for the starting and stopping an application embodying a hierarchical hosting relationship. During stage 800, a bootstrap process on a computer system issues a start platform request to a loaded platform object. In response, during step 802 the platform process issues a call to the bootstrap interface requesting the bootstrap to start all the application engines hosted by the platform object. During stage 804, the bootstrap process creates an application engine object having the attributes discussed hereinabove.

During stage 806, the application engine process starts all of its hosted application objects. The application engine also registers the hosted application objects with a scheduler process during stage 808. Registering an application object adds that application object to the set of application objects that the scheduler scans during each scan cycle. At stage 810, the application engine issues a command to the scheduler to begin executing/scanning the started and registered application objects. Thereafter, at stage 812 the scheduler executes the registered application objects. Such execution is performed periodically during each scan cycle.

The scheduler continues to periodically scan the registered application objects in accordance with a supervisory process control and manufacturing information system application until receiving a shutdown command. In particular, the bootstrap process, during stage 814, issues a shutdown command to the platform process in response to an operating system shutdown command. During stage 816, the platform process returns a stop engine command to the bootstrap to commence shutting down all engines hosted by the platform process. In response, during stage 818 the bootstrap issues a request to the application engine to stop. The bootstrap will wait for the application engine to stop. However, after a period, if the application engine has not stopped, the bootstrap will request the operating system to shut down the application engine process.

Under normal operating conditions, during stage 820 the application engine issues a command to the scheduler to un-register the engine's hosted application objects. Furthermore, in an embodiment of the invention, the engine requests to its hosted application objects to shut down. However, in alternative embodiments of the invention the shutdown request is issued by the scheduler in response to the un-register command.

It is noted that in the above-described exemplary embodiment, the engine objects and platform objects communicate with the bootstrap process and handle aspects of the supervisory process control and manufacturing information application relating to physical computing device configurations upon which the application executes. However, the application objects themselves only communicate with the engine and scheduler according to a platform-independent interface. The one or more engine objects hosting the application objects insulate the application objects from characteristics of the computer systems upon which the application objects execute. Thus, the application objects execute independently of the physical computing device configurations. The application objects, though constrained to execute on a same engine with other application objects designated within a same area, are not constrained by any requirement to execute upon a particular one of multiple capable engines and/or platforms within a system. Thus, moving an area comprising a set of application objects is performed with minimal interruption to the execution of other application objects running on the affected engines.

Figure 9:
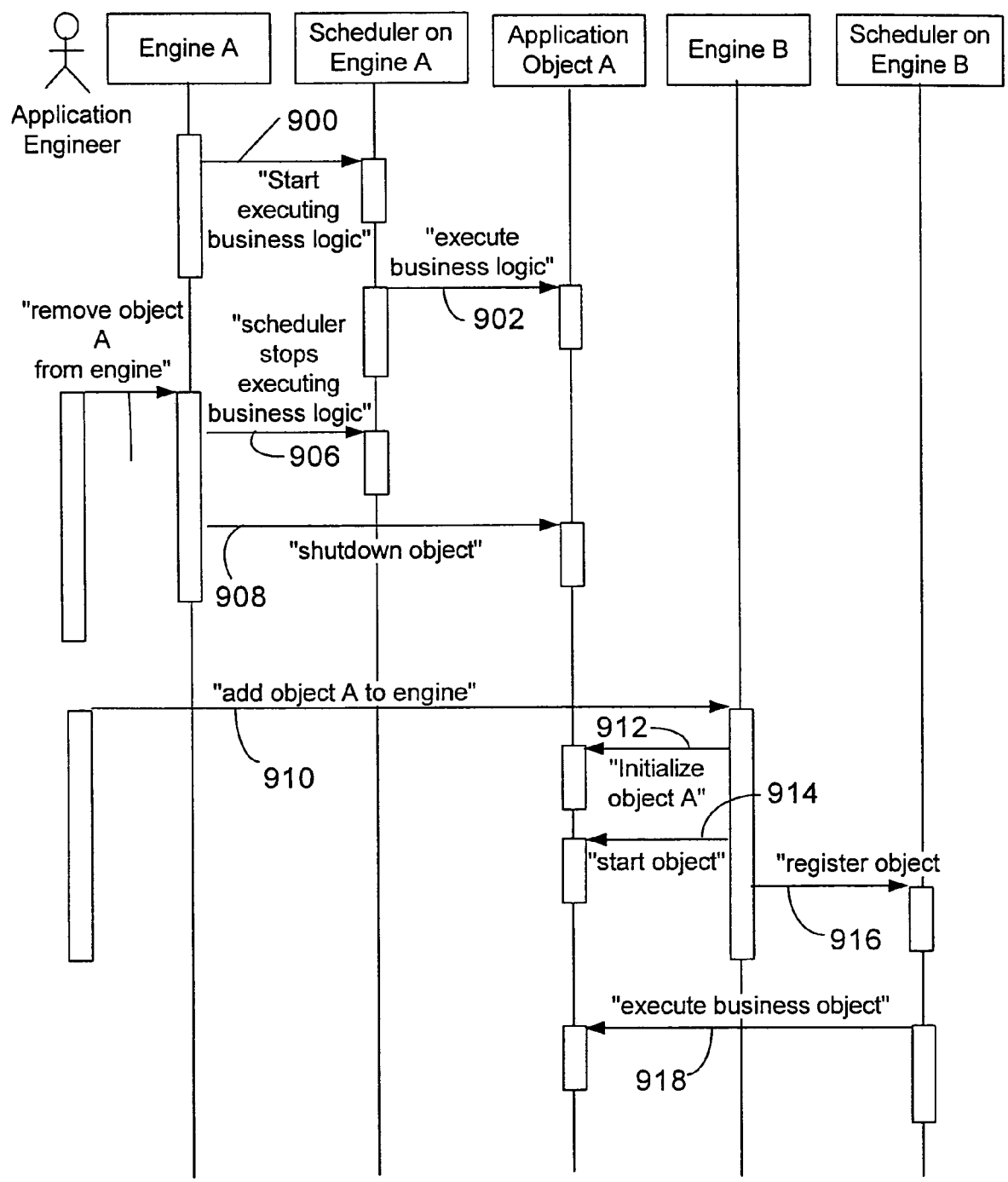
FIG. 9 is a sequence diagram summarizing a set of steps for moving an object to another engine in a network comprising multiple application engines.

Turning to FIG. 9, a sequence diagram illustrates the operational independence of an application object with regard to its engine object host, and the ability to re-deploy an application object upon another host engine. Beginning at stage 900, an engine A issues a start command to a scheduler A to commence periodic execution/scanning of an application object A. During stage 902, the scheduler A periodically activates the application object A to perform its business logic in association with an application comprising multiple application objects.

Later, an application engineer decides to migrate the application object A to an engine B on a different computer platform. One reason to make such a change is to reduce computational load on a computer device as a system grows. The user issues a request to the engine A to remove application object A during stage 904. In response, during stage 906 the engine A issues a request to the scheduler A to stop scanning the application object A. During stage 908, the engine A issues a command to the application object A to shut down. The operation of the engine A and scheduler A is otherwise unaffected by the removal of application object A.

In an embodiment of the invention, the application is spread across multiple computing devices, and each computing device is equipped with the platform, engine and scheduler objects of the application hierarchy that facilitate executing application objects. The replication of lower-level hosting functionality across multiple hardware platforms provides a degree of platform independence that enables relocating an application object without affecting the operation of the application. Thus, during stage 910 the user adds application object A to engine B on a different computer. During stage 912, the engine B initializes the newly added application object A. The initialization stage 912 includes, for example, any custom initialization performed by an application object before starting the application object (e.g., initialization of class variables, caching interfaces used by the application object, etc.). At stage 914, the engine B issues a start command to the application object A. At this point, the object assumes all of its primitives have been initialized and it can perform any initial calculations based on the attributes maintained in these primitives. Engine B registers the executing application object A with a scheduler B on the new computing platform during stage 916. Thereafter, at stage 918 the scheduler B periodically prompts the application object A to execute its business logic. The results of executing application object A are rendered both locally and over a network connecting the engines. Thus, re-locating application object A to engine B does not affect data access concerning application object A.

INTER-OBJECT COMMUNICATIONS VIA MESSAGE EXCHANGE

In an embodiment of the present invention, the application objects reference other objects by logical name rather than physical address. Thus, communications between application objects within a same application, as far as the application objects are concerned, are insulated from the underlying physical configuration of a network containing the application object. A component of the application, referred to as message exchange, embedded within the platform and engine objects enables application objects to retrieve (get) and send (set) data from/to other objects located anywhere within a network executing the distributed application. Message exchange is a peer-to-peer communication infrastructure that enables specifying a target by logical name rather than physical network address. The application objects are thus permitted to carry out communications without regard to the physical location of an intended recipient of a data request. This also enables the application object layer of an application to be developed without regard to where the application objects are ultimately deployed. In an embodiment of the invention, the message exchange is divided between a local message exchange (LMX) carried out by an application engine and a network message exchange (NMX) carried out by a platform to enable named requests to be communicated between computing devices connected over a network for carrying out a distributed application. In yet another embodiment of the invention, the LMX and NMX functionality is carried out by the engines. This arrangement avoids extra, inter-process communications required in the event that the platform object carries out NMX.

The LMX incorporated into the engine objects (e.g., application engine objects) provides services enabling application objects to access data maintained as attributes on other objects. When using LMX services to access target data, application objects specify a string representing a piece of data associated with an object (e.g., an attribute specified in the form of "ObjectB.AttributeA"). With this string, LMX locates the data associated with the object (potentially requesting NMX services provided by the platform to access a target object located on another computing device in a network). LMX returns the data, associated with the object, to the application object that requested the data. In addition, the message exchange guarantees certification of message delivery. Therefore, when application objects send messages to other application objects they receive confirmation that the target of the message received or did not receive the message.

The LMX of the application engine includes, by way of example, a set of interfaces. The set of interfaces comprises: IMxSupervisoryConnection and IMxUserConnection. The IMxSupervisoryConnection interface defines methods used by application objects to access information from physical devices in a plant. The methods used on this interface comprise: SupervisoryRegisterReference, SupervisoryGetAttribute, and SupervisorySetAttribute. The SupervisoryRegisterReference method is called by application objects to inform message exchange that a request to access a value of an attribute is forthcoming. The SupervisorySetAttribute method is used by application objects to direct message exchange to modify the value of the attribute specified in a previous SupervisoryRegisterReference call. The SupervisoryGetAttribute method is used by application objects to direct message exchange to retrieve the value of the attribute specified in a previous SupervisoryRegisterReference call.

The IMxUserConnection interface defines methods used by applications to visualize data retrieved from physical devices in a plant. The methods used on this interface comprise: UserRegisterReference, UserGetAttribute, and UserSetAttribute. These methods are very similar to the methods of the IMxSupervisoryConnection interface described hereinabove. One difference is that the methods of the IMxUserConnection interface methods cater to user interface clients by allowing data updates via a callback mechanism instead of a polled mechanism utilized by the IMxSupervisoryConnection.

A set of structures is utilized to carry out the functionality of the message exchange. An MxReference structure is a MICROSOFT Component Object Model (COM) object that implements an interface IMxReference, identifies an attribute of an object whose value is to be accessed by application objects, and is passed into the methods SupervisoryRegisterReference, and UserRegisterReference. The MxReferenceHandle (an integer value) is used by message exchange to provide application objects a location-transparent means of retrieving a value referred to by an MxReference. The MxReferenceHandle is returned to application objects by the message exchange on successful completion of a SupervisoryRegisterReference or UserRegisterReference call. The MxReferenceHandle is passed in, by application objects, to method calls for getting and setting attributes such as: UserSetAttribute, UserGetAttribute, SupervisorySetAttribute and SupervisoryGetAttribute.

An MxHandle structure identifies a property of an object's attribute. The MxHandle identifies a platform and an engine to which the object belongs. The MxHandle comprises two structures: an MxAutomationObjectHandle and an MxAttributeHandle. The MxAutomationObjectHandle is the data structure used to represent the location of the object within the overall system. The MxAttributeHandle data structure is used to identify the property of an attribute within the object. The MxAttributeHandle structure is used, internally, by message exchange to quickly locate an attribute of an object.

The MxAutomationObjectHandle data structure includes five fields: galaxy, platform, engine, object, and signature. The galaxy field identifies the general system to which the referenced object belongs. A platform field identifies the platform object with which the referenced object is associated. An engine field identifies the object's engine. An object field identifies an object. A signature field stores a value derived from the object's name and prevents configuration mismatches that can occur when an object is relocated.

The MxAttributeHandle data structure includes seven fields: primitiveID, attributeID, propertyID, index1, index2, index3 and signature. The primitiveID field identifies a primitive within an automation object. A primitive is a helper object that performs a specific operation in, for example, an application object. The attributeID identifies a particular attribute within an identified primitive. A propertyID identifies a property of an attribute. Index fields 1, 2 and 3 provide indexes into up to a three-dimensional array. A signature field stores a checksum value derived from the content of the MxAttributeHandle to prevent configuration mismatches.

It is noted that the message exchange, in an embodiment of the present invention, includes additional data structures and interfaces. Such additional interfaces and structures will be known to those skilled in the art. It is further noted that the present invention is not limited to systems that utilize message exchange to provide a hardware/deployment independent messaging service for inter-object communications for a set of application objects within a supervisory process control and manufacturing information application.

MULTIPLE VIEWS/LATE BINDING OF A MODEL TO A DEPLOYMENT

Another aspect of the proposed application architecture is the specification of associations within objects. The associations, discussed herein below, enable a configuration component, referred to herein as the Integrated Development Environment (IDE) to filter and display a set of related objects in a variety of views including at least a (logical) model view and a (physical computing) deployment view. The IDE, through its displayed views of an application configuration, enables a user to design and deploy an application in a computer network comprising multiple computing devices.

The application configurations are stored as "packages" within the configuration database 124. A package framework subsystem provides an interface enabling the IDE to store and retrieve the objects of the packages. The package framework employs a relational database to store package data and knowledge regarding the objects' associations/relationships with other objects. The IDE queries the package framework to deliver a list of objects based on a designated association with regard to an object. For example, the IDE can request the package framework to retrieve from a package the objects hosted by a named engine.

A developer builds the aforementioned associations (or "relationships") between objects via the IDE and package manager. Such associations include, by way of example, the following pre-defined assignment relationships: host, area, container, engine and platform. Each of these relationships is discussed herein below.

A host relationship is used at runtime to indicate where an object executes. Furthermore, an object may not be deployed unless its host is deployed. An application object is hosted by an area object, an area object is hosted by an engine object, and an engine object is hosted by a platform object. An area relationship establishes a logical grouping of objects and provides a means for collecting events and alarms raised by objects grouped under the area. A container relationship specifies a loose coupling between two objects and is only meaningful in the context of the application logic. Example: a Valve object contained inside of a Tank object. Contained objects are allowed to acquire hierarchical names within the context of the objects' container. By way of example, a valve that acts as an inlet is assigned the alias "inlet" and receives the hierarchical name of "Tank.Inlet." An object's engine is the actual engine that executes the object. An object's platform is the one and only platform object running on a computer device upon which the object is deployed. An object may have all five of these relationships, but only one object may be associated to any one of these relationships. For example, an application object can be assigned to one and only one area.

A model view depicts the application in terms of logical associations between plant/process equipment within a controlled plant process—e.g., a representation of a physical plant layout. A deployment view depicts the physical computer devices and assignment of instantiated objects identified in the model view to the computer devices and engines executing upon the computer devices. A derivation view depicts the sources (inherited property relationships from base template to instance) of objects instantiated from templates to carry out the functionality of the model view elements.

Figure 10:
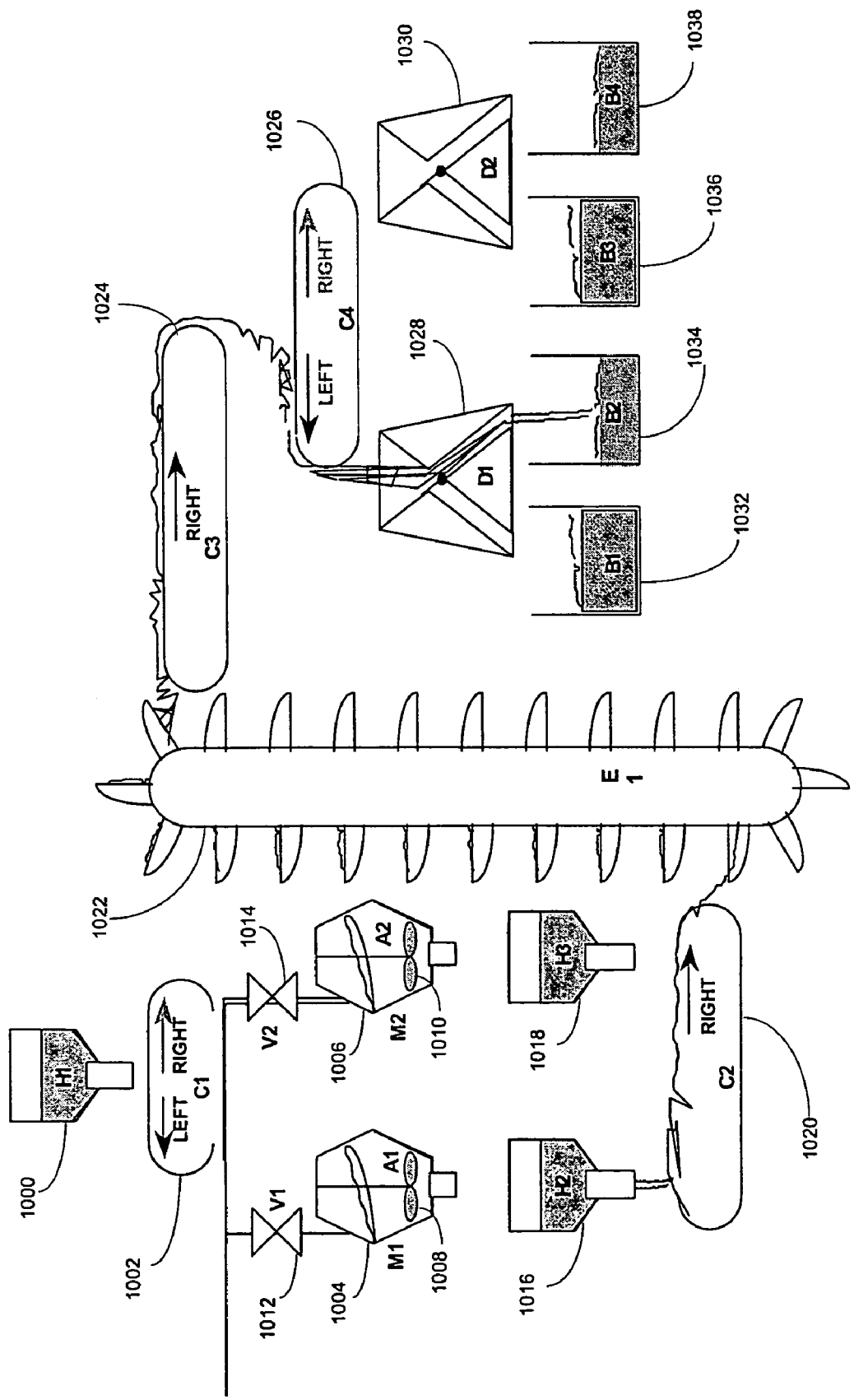
FIG. 10 is a schematic diagram depicting controlled components of a simple plant process.

FIG. 1 shows, by way of example, an application physically deployed to two application server computers 100 and 102. Alternatively, an application is presented to users by visually depicting the role of application objects in carrying out supervisory process control and/or extracting manufacturing information according to the application. Turning now to FIG. 10 a plant process application is depicted, in a plant model, according to the roles of application objects in the plant process. This illustrative example is scaled down for purposes of illustratively depicting an exemplary embodiment of the invention. As those skilled in the art will readily appreciate, the present invention is applicable to a wide variety of industrial/plant monitoring/control applications that are far more complex than this example.

A hopper H1 1000 having a controlled outlet valve delivers raw product to a conveyor C1 1002 that is controllable to travel left, night, or be disabled. The raw product is dumped, by the conveyor C1 1002 into a mixer M1 1004 and a mixer M2 1006. The raw product is allowed to pass into the mixers by opening valve V1 1012 and V2 1014 of mixer M1 1004 and mixer M2 1006, respectively. The mixer M1 1004 and mixer M2 1006 include a controllable agitator A1 1008 and A2 1010 respectively. The mixed product drops into hoppers H2 1016 and H3 1018. The hoppers H2 1016 and H3 1018 are selectively opened to allow the mixed product to fall upon a conveyor C2 1020 that either travels right or is disabled. When enabled, the conveyer C2 1020 drops the mixed product onto an elevator E1 1022. The elevator E1 1022 deposits the mixed product onto a conveyer C3 1024 that travels right. The conveyor C3 1024 deposits the material onto a distribution conveyor C4 1026 that is capable of traveling both left and right thereby distributing the mixed product between a first bi-state door D1 1028 and a second bi-state door D2 1030. The door D1 1028 is controllable to direct finished product into either bin B1 1032, or B2 1034. The door D2 1030 is controllable to direct finished product into either bin B3 1036 or bin B4 1038.

While the above-described process line depicted in FIG. 10 is simple, and thus relatively easy to follow, in most cases processes are very complex and include hundreds and even thousands of distinct, sensors and controlled components. In such instances, the application objects corresponding to the sensors and controlled components are logically grouped within areas. The logical grouping of application objects is exploited during runtime to provide a uniform treatment of particular application objects for alarm and event management. For example, all alarms in a particular area can be disabled by a single attribute designation within the area object. The compatibility of the host area and hosted objects is determined by checking the "required host features" of the hosted object and the "supported features" specified by the hosting area object. These object attributes are established when the objects are built. If the "required host features" are met by the "supported features," then the host assignment is completed by assigning appropriate values to hosted objects. An object is placed within an area by designating the area name in the area attribute 328 of the common primitive of an application or area object.

Areas themselves can be grouped within other areas in a hierarchical arrangement. Assigning an area to another "host" area is accomplished, by way of example, by designating the name of the host area in the area attribute 328 of the hosted area object. The relationship between areas and sub-areas are not constrained to execute on a same engine. Thus, sub-areas within an area can be assigned to different application engines when the application objects of a supervisory process control and manufacturing information application are deployed within a system comprising multiple platform objects (corresponding to multiple computer devices) and engine objects. However, in an embodiment of the invention, application objects specified within a sub-area are restricted to deployment on a same application engine. This restriction ensures that processing of all application objects in an area occurs without inter-node communication delays.

Area objects, by way of example, include the following attributes that facilitate the above-described functionality: alarm information, disable all alarms, disable the display of all alarms, sub-area list.

Figure 11:
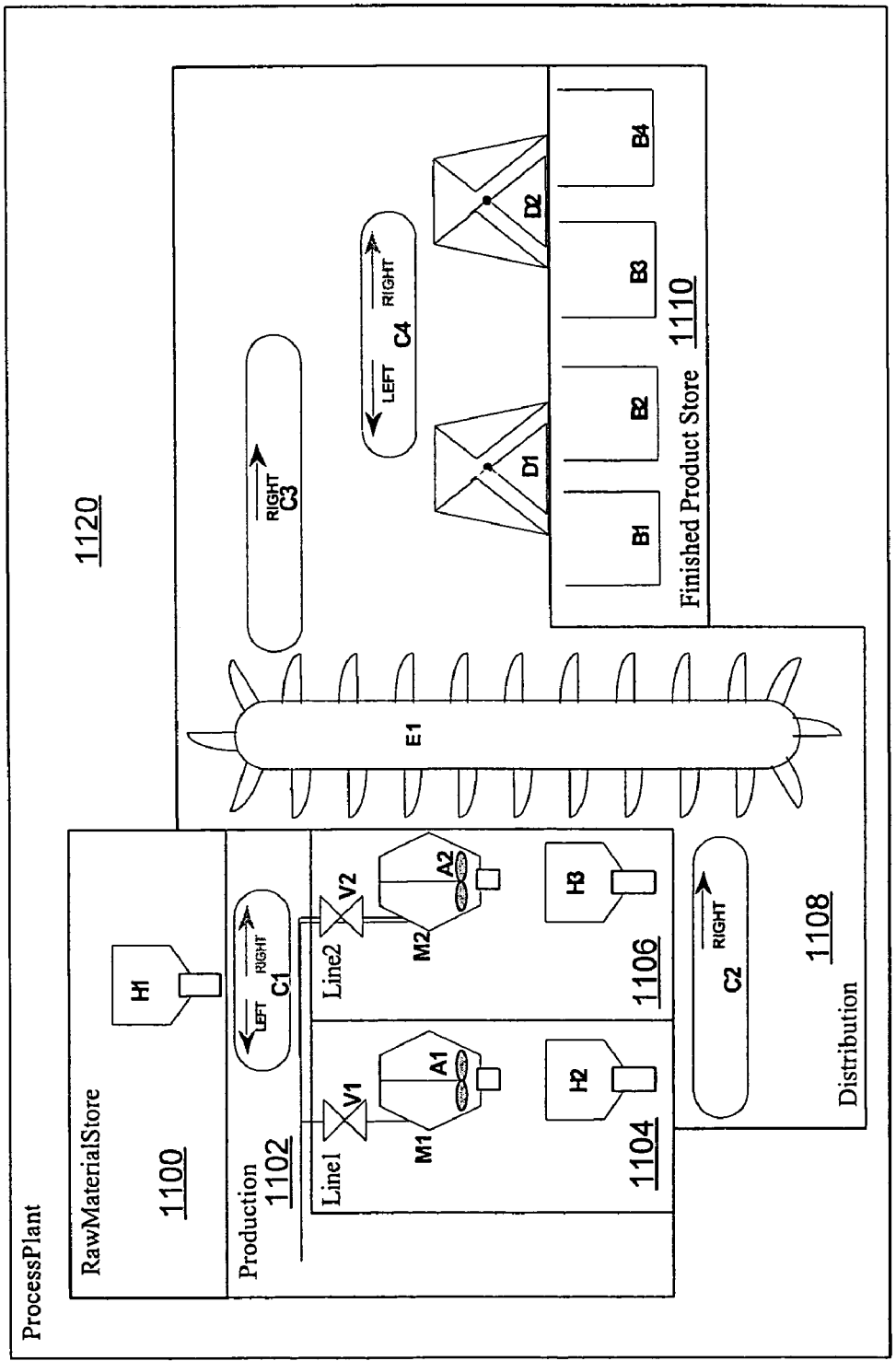
FIG. 11 is a schematic diagram depicting the simple plant process components logically grouped into areas.

Turning to FIG. 11, logical grouping of related process components of FIG. 10 into areas is demonstrated. The revised process illustration depicts the system as a series of areas comprising logically grouped controlled process components. A raw material store area 1100 includes the hopper H1 1000. A production area 1102 includes the conveyor C1 1002, a line1 area 1104 including the mixer M1 1004, valve V1 1012, and hopper H2 1016, and a line2 area 1106 including the mixer M2 1006, valve V2 1014, and hopper H3 1018. A distribution area 1108 includes the conveyor C2 1020, the elevator E1 1022, the conveyer C3 1024, conveyor C4 1026, bi-state door D1 1028 and bi-state door D2 1030. A finished product store area 1110 includes bins B1 1032, B2 1034, B3 1036 and bin B4 1038. The set of sub-areas are grouped under a single process plant area 1120.

Figure 12:
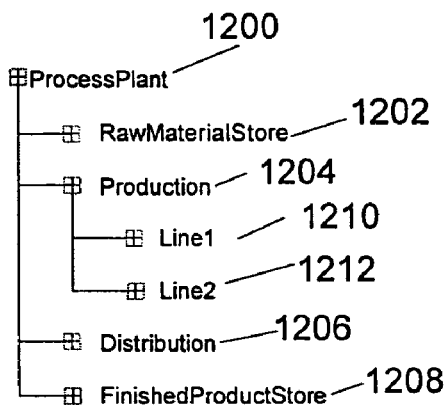
FIG. 12 is a hierarchical tree structure depicting the grouping of areas in the plant arrangement of FIG. 11.

Having described an exemplary plant process and two alternative ways in which to view an application relating to the plant process (i.e., plant model and application object deployment views), a configuration utility interface is described that displays the application components according to these two alternative views. Turning briefly to FIG. 12, a partially completed model view user interface generated by a configuration utility depicts an area hierarchy represented in the form of a tree. The tree structure presents a high-level model view of the areas designated in a process plant depicted in FIG. 11. This model view is incomplete since it does not identify the application objects grouped within the identified areas and containment relationships for application objects.

With reference to the exemplary tree structure, a process plant node 1200 corresponding to the process plant area 1120 is designated at the highest level of the hierarchical area representation. A set of secondary nodes, corresponding to sub-areas grouped within the process plant area 1120, branch from the process plant node 1200. Raw Material Store node 1202, Production node 1204, Distribution node 1206 and Finished Product Store node 1208 correspond to the raw material store area 1100, the production area 1102, a distribution area 1108 and a finished product store area 1110 respectively. A line 1 node 1210 and a line 2 node 1212 branching from Production node 1204 correspond to the line 1 area 1104 and line2 area 1106 grouped within the production area 1102 in FIG. 11. This view enables a technician to quickly identify and specify logical groupings for defining policies governing application objects such as alarming behaviors, etc.

Before describing an expanded version of the model view of FIG. 12 identifying application objects and compounds within the identified areas, derivation of objects from templates is discussed. Each of the components identified in FIG. 10 corresponds to an application object. In an embodiment of the invention, application objects are instantiated from object templates. A derivation view represents all the types of templates from which application objects specified by a current model for an application are derived.

The set of candidate templates from which application objects are derived is extensible. Users are provided toolkits including base templates and editors to define customized new templates from which a user builds application objects. Examples of base templates (where $ denotes a template) are: $DiscreteDevice—a state machine that is configurable to create an application object representing the main conveyors and valves depicted in FIG. 10, and $UserDefined—a simple object template that contains only the common primitive, and from which the user builds extensions within the configuration environment by adding scripts and attributes to model the application objects corresponding to the bins and hoppers.

Figure 13:
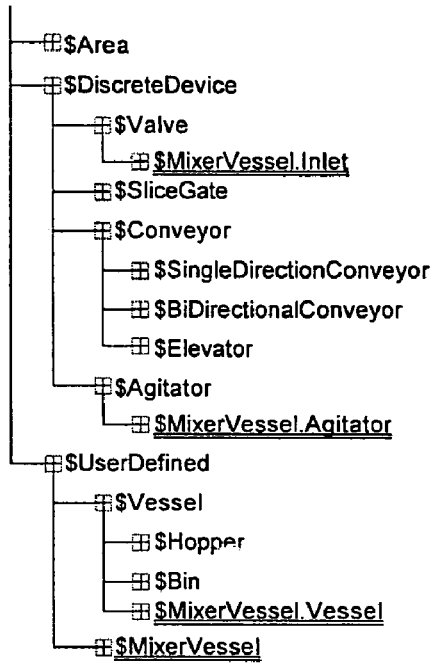
FIG. 13 is a hierarchical tree structure representing the derivation relationships of objects of a supervisory process control application associated with the plant process depicted in FIG. 10.

Turning to FIG. 13, an exemplary derivation view rendered by a derivation view generated is illustratively depicted. With reference to FIG. 13, in the case of the example set forth in FIG. 10, the user derives from a $DiscreteDevice base template a $Valve, a $SliceGate, a $Agitator, and a $Conveyor custom application object template type. Under the $Conveyor template, the user further defines a $SingleDirectionConveyor, a $BiDirectionalConveyor, and an $Elevator template type. Under a $UserDefined base template the user derived a $Vessel application object template. The $Vessel template is further refined to derive a $Hopper and a $Bin application object. With reference to FIG. 13, the base templates occupy the highest levels of the hierarchical derivation tree that is rendered by a configuration view generator based upon a user's designation of particular templates. Object templates derived from the base templates are identified by branches leading from the base template nodes. As depicted in FIG. 13, it is possible to derive objects from other derived objects. In such cases, the children inherit the designated characteristics of their parent templates. The derivation relationship between a child and its parent template is registered in the derived from attribute 314 of the template object.

Application object containment (specified in container attribute 330 of an application object), and the creation of compound object templates from a set of previously defined object templates is another aspect of the template architecture disclosed herein. In an embodiment of the invention, containment is limited to same object types. Thus, area objects can only contain area objects and application objects can only contain other application objects. Objects containing other objects are referred to herein as "compounds." Objects that exist solely to contain other objects are referred to as "composites."

Figure 14A:
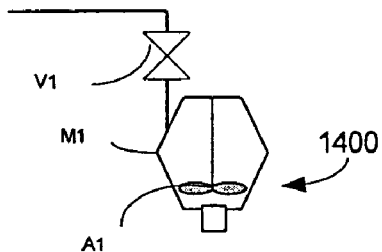
FIG. 14a is a schematic drawing of a mixer vessel portion of the plant process depicted in FIG. 10.
Figure 14B:
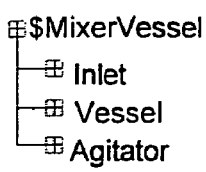
FIG. 14b is a hierarchical model view depicting the containment relationship of a MixerVessel compound application object template corresponding to the mixer vessel depicted in FIG. 14.

Turning briefly to FIGS. 14*a* and 14*b*, an example is provided of a compound application object template—in this case a $MixerVessel compound object template that includes a valve object that is assigned the tag name "inlet", an agitator that continues to carry the tag name of "agitator," and a mixer that has been assigned the tag name "vessel." The contained name attribute 310 of the templates corresponding to each of these three contained objects. The full hierarchical tag name (e.g., MixerVessel.Inlet) is stored in the hierarchical name attribute 318 for each of the three contained objects. The container attribute 330 for each contained object is assigned the string "MixerVessel." FIG. 14*a* schematically depicts a portion of the process plant depicted in FIG. 10 that contains a mixer vessel arrangement. A model view of the compound template showing the containment relationship between the $MixerVessel application object template and its contained (renamed) application objects is depicted in FIG. 14*b*. In an embodiment of the invention, when instantiated within an actual application, all application objects contained within a compound application object designate a same host in attribute 338 (and by requirement a same area in attribute 328. This containment hierarchy, applicable to other objects as well (subject to any deployment restrictions), assists system developers in developing systems by supporting the creation of logical building blocks (comprising many smaller application objects) from which applications can be built.

A "contain" function supported by the IDE, in an embodiment of the present invention, facilitates establishing containment relationships between objects via a graphical user interface "drag and drop" operation. To establish a containment relationship between a source and target (container) application object, a developer selects the source application object displayed on a user interface, drags the source application object on top of the target (container) object, and then drops the source application object on the target application object. After the IDE confirms the compatibility between the two objects (i.e., they are both application objects), the IDE (through the package manager utility) sets the host, area and container attributes in the source object. In particular, the area attribute 328 is set to the target object's area, the host attribute 338 is set to the target's host, and the container attribute 330 is set to the target object's name. At this point the contained name attribute 310 and the hierarchical name attribute 318 of the source are also filled in with names provided by the developer.

Returning to FIG. 13, the $MixerVessel compound application object template is assigned a branch under the $UserDefined base template node and specifies the contained relationships between the application object template elements of the compound. Furthermore, a $MixerVessel.Inlet template derived from $Valve is placed under the $Valve template node. A $MixerVessel.Vessel template derived from $Vessel is placed under the $Valve template node. A $MixerVessel.Agitator template derived from $Agitator is placed under the $Agitator template node. The containment relationship is registered by specifying the $MixerVessel template object in the container attribute 330 in each of the compound elements. The containment relationship is indicated in the derivation view tree of FIG. 13 by a "$MixerVessel" preamble in the $MixerVessel.Inlet, $MixerVessel.Agitator, and $MixerVessel.Vessel object template representations within the derivation view tree.

Attribute locking and its effect upon change propagation in templates are yet other aspects of the derivation architecture of the exemplary configuration utilities disclosed herein. The derivation architecture enables information within an object template to be propagated to derived objects or alternatively a default value is specified for a derived template that can be overridden by a developer. In an embodiment of the invention, propagation is affected automatically by storing a reference to a parent's copy of a locked attribute.

An attribute in a template or instance can be unlocked, locked in parent, or locked in me. Both templates and instances can have unlocked attributes. An unlocked attribute is read-write, and the object has its own copy of the attribute value—i.e., it is not shared by derived objects. A template, but not an instance can have a locked in me attribute status. In the case of a locked in me attribute, the value is read-write. Derived objects do not get their own copy of the attribute value, but instead share the locked value by reference to an ancestor where the attribute is locked. The status of the attribute in the children of a locked in me attribute is "locked in parent." Thus, changes to the value of a locked in me template attribute propagate to all children. Both templates and instances can have a locked in parent attribute. A locked in parent attribute is read-only.

The interface for getting and setting a locked status of an attribute is exposed to configuration clients. The client obtains a reference to the attribute and sets its locked status. Whether a change to an attribute is permitted and/or propagated to derived children is based upon whether a particular attribute in a template is locked. Locking an attribute has two consequences. First, a locked in parent attribute cannot be modified in a derived template or instance. Second, a locked in me attribute in a template can be changed, and the change is cascaded down through all templates and instances derived from the template containing the locked attribute. On the other hand, if an attribute is not locked, then the attribute specifies a default value that can be overridden in a derived template. Furthermore, if the value of a non-locked attribute is changed, then the change is not cascaded to derived templates.

After establishing a set of templates that are to be used for the application objects identified in FIG. 10, the application object instances are created from the templates according to the proposed supervisory process control and manufacturing information application. Using the templates defined in FIG. 13 and the exemplary process plant depicted in FIG. 10 the following application objects are rendered:

$MixerVessel is used for Mixer M1 and M2;
$Hopper is used for Hopper H1, H2 and H2;
$SingleDirectionConveyor is used for conveyors C2 and C3;
$BiDirectionalConveyor is used for conveyors C1 and C4;
$SlideGate is used for Door D1 and D2; and
$Bin is used for Bins B1, B2, B3 and B4

Figure 15:
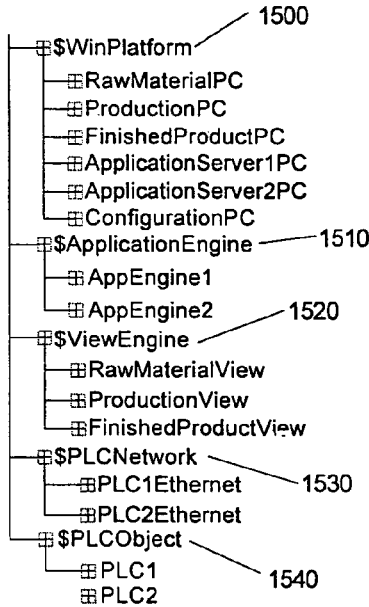
FIG. 15 is a hierarchical tree structure representing a derivation structure for portions of the application associated with the hardware of a system (e.g., platforms, engines, and device integration objects)

Turning to FIG. 15, a hardware derivation view depicts the sources of engine and platform objects from object templates. Such a view is beneficial when deciding where to distribute or re-locate areas that have particular engine and/or platform requirements. Node 1500 corresponds to a WINDOWS operating system-based platform template. A set of platform instances, corresponding to platform objects derived from the WINDOWS operating system-based platform template, branch from node 1500 and correspond to each of the personal computers identified in FIG. 1. Node 1510 corresponds to an application engine template. A set of application engine instances, derived from the application engine template, branch from node 1510 and correspond to the application engines depicted in FIG. 1. Node 1520 corresponds to a view engine template. A set of view engine instances branch from node 1520 and correspond to the view engines depicted in FIG. 1. Node 1530 corresponds to a PLCNetwork device integration object template. A set of instances branching from node 1530 correspond to device integration objects identified in FIG. 1 that support configuring the OPC servers 116 and 118. Finally, node 1540 corresponds to a PLCObject device integration object template. A set of instances branching from node 1540 corresponds to device integration objects identified in FIG. 1.

Figure 16:
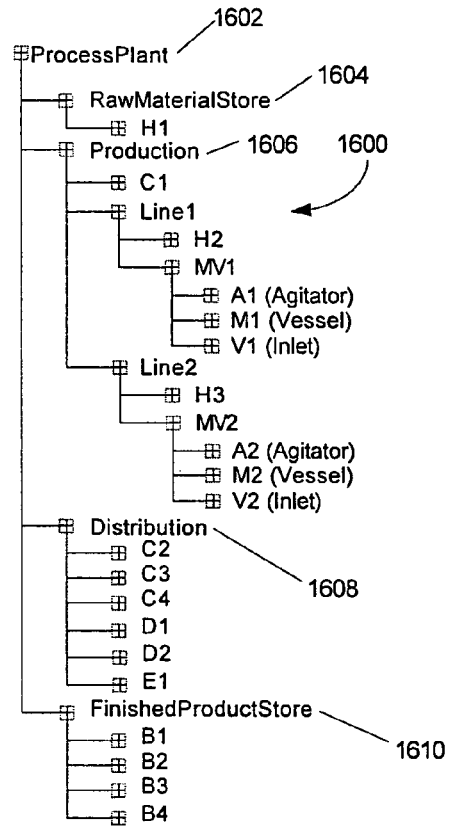
FIG. 16 is a hierarchical tree structure presenting a model view of application object arrangement including the areas with which the application objects are associated.

FIG. 16 represents a model view of the process application depicted in FIGS. 10 and 11. The model view displays area hosting and containment relationships specified by objects (including application objects and areas). The model view identifies the objects that are logically grouped together for purposes of describing the plant layout. The model view enables a user to quickly designate objects that will be treated uniformly under a particular policy (e.g., alarming, etc.). The model view includes, by way of example, nodes corresponding to the areas designated in FIG. 11 and depicted in the area tree structure of FIG. 12. The leaves of the tree 1600 identify the application objects and their assignments to the identified areas. Furthermore, the model view tree depicts compound containers such as a set of compound container objects MV1 and MV2 instantiated from the $MixerVessel compound template (discussed above with reference to FIG. 13).

The model view is rendered by a model view generator based upon the area and container attributes of the objects specified under a particular application. In an embodiment of the invention, the compatibility of an area/container with a grouped/contained object is determined when a user seeks to create the association. This compatibility is determined by comparing the support features of the parent object to the needs of the grouped/contained child object. Furthermore, in an embodiment of the invention all objects within a container are required to designate a same area.

Areas can be hierarchical. Thus, an area can include an area, and a parent area collects alarm statistics for all objects in its sub-areas. In a model view hierarchical tree structure depicted in FIG. 16, starting at the highest level of the tree structure, if no area is designated for an area object, then the area object (e.g., ProcessPlant 1602) is connected directly to the root node (the highest level of the tree). At a next level, sub-areas of the ProcessPlant 1602 (i.e., RawMaterialStore 1604, Production 1606, Distribution 1608 and FinishedProductStore 1610) are connected as branches under the ProcessPlant 1602 node. In the exemplary application model tree 1600, the branches from the sub-areas contain application objects (i.e., hopper H1, conveyors C1–C4, doors D1–D2, elevator E1, and bins B1–B4), and additional sub-areas (i.e., Line1 and Line 2 in the Production 1606 sub-area). The Line1 and Line2 sub-areas both include compounds (i.e., mixer vessels MV1 and MV2). The leaves of the compounds MV1 and MV2 identify the objects contained by the compound objects. In the particular example, the MixerVessel compound MV1 includes an agitator A1, a vessel M1 and an inlet valve V1. The MixerVessel compound MV2 includes an agitator A2, a vessel M1 and an inlet valve V1.

Figure 17:
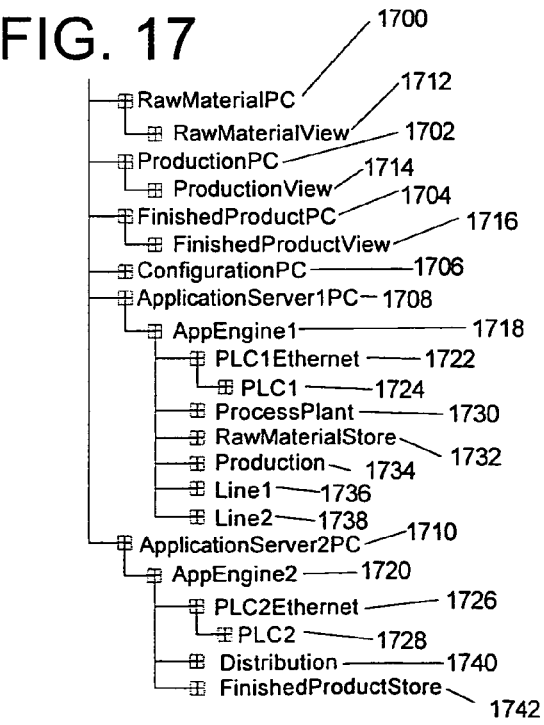
FIG. 17 is a hierarchical tree structure presenting a deployment view of the application to a set of computer devices represented by identified platform objects at the top level of the hierarchy.

FIG. 17 represents an exemplary deployment view of the application model's areas to the hardware and platform depicted in FIG. 1. The deployment view visually depicts where the various objects of an application execute. A deployment view is therefore rendered based upon the hosting (attribute 338) and the containment (attribute 330) relationships designated by objects. A child area object is not constrained to execute upon the same application engine as a specified parent area (in attribute 328), and the area relationships designated by objects are not applied when rendering the deployment view. ApplicationObjects are Hosted (attribute 338) by their area, therefore the deployment view shows the ApplicationObject relationship to its area. Thus, the deployment view (and the actual deployment of nested area objects) does not reflect alarm/event concentration and propagation associated with the hierarchical area model relationships designated between area objects.

The application objects are not displayed in FIG. 17. However, a deployment view generator arranges the application objects under appropriate areas based upon the host/container designations within those objects. In an embodiment of the invention, an application object's designated host and area are, by requirement, the same. Therefore, all application objects referencing an area object are executed upon a same engine object identified in the host attribute 338 of the area object. This requirement ensures that alarms and data maintained for application objects under a particular area are maintained locally on a same computer device. If an application object specifies a container (compound application object) in attribute 330, then the named container overrides the named area host when generating a deployment view tree (i.e., an application object within a compound (container) is placed under its designated compound name). However, in an embodiment of the invention all application objects contained within a compound are constrained to execute upon a same host (i.e., all contained application objects acquire the compound/container's designated area).

The deployment view set forth in FIG. 17 is especially appropriately classified as exemplary since the areas and their associated objects are capable of running on any suitable platform/application engine combination. The multi-layered platform/engine/area/application object hosting arrangement renders the various areas (and their associated application objects) capable of installation at any suitable hosting engine branch in the graphical representation of the deployment of application components depicted in FIG. 17. The highest level of the deployment tree hierarchy identifies a set of platforms corresponding to the personal computers depicted in FIG. 1. The set of platforms represented by nodes include: a RawMaterialPC node 1700, a Production PC node 1702, a FinishedProductPC node 1704, a ConfigurationPC node 1706, an ApplicationServer1PC node 1708, and an ApplicationServer2PC node 1710.

A set of engines is deployed to the platform hosts. The set of deployed engine object nodes corresponding to engine objects hosted by the indicated platform objects includes: a RawMaterialView engine node 1712, a ProductionView engine node 1714, a FinishedProductView engine node 1716, an AppEngine1 node 1718, and an AppEngine2 node 1720.

The engines host device integration and area groupings of application objects that are represented in the deployment view as nodes. The set of device integration object nodes corresponding to deployed device integration objects includes PLC1Ethernet node 1722 and PLC1 node 1724, and PLC2Ethernet node 1726 and PLC2 node 1728. The set of area object nodes corresponding to deployed areas comprising groups of application objects and/or other areas includes a ProcessPlant node 1730, a RawMaterialStore node 1732, a Production node 1734, a Line1 node 1736, a Line2 node 1738, a Distribution node 1740 and a FinishedProductStore node 1742. The branches connecting the above-identified area nodes to their associated engines corresponds to the engines designated in the host attribute 338 in the area objects and their associated application objects that, for the sake of avoiding undue clutter, are omitted from the deployment view set forth in FIG. 17.

Another aspect of the above-described application architecture is the task of actually distributing a configured application to the plurality of computer devices that execute the configured supervisory process control and manufacturing information application. Since each computer device executes a distinct portion of the application, the set of underlying software components/modules required on each computer is likely to differ between computers to which the application is distributed. Furthermore, in an embodiment of the invention, configuration information for an application is maintained separate from the executable software that runs on a computer in association with the distributed objects (e.g., platform object, engine object, area object, container object, application object, etc.) that make up the application. The application software and configuration information for each object of an application are bundled as a set of properties into a structure referred to herein as a package. The software itself is not included in the package for an object. Instead, since many objects may use a same code module (e.g., an EXE of DLL file), a reference to the software is included in the object package.

A method for deploying a configured application described herein below includes steps to ensure that the components needed by a target computer to provide a sufficient software framework for a particular portion of the application are transferred from a source to the target computer. Furthermore, if needed software is already present on the target computer, then that software is not transferred. The computer software loading operation takes place across a computer network via standard network data communications protocols under the guidance of a user via the IDE.

By way of example, deployment can occur on an individual object instance, on a group of selected object instances, and on a cascade basis (based upon relationships between a selected instance and hierarchically related objects). The deployment process first checks and delivers the necessary software and then transfers the object configuration.

Figure 18:
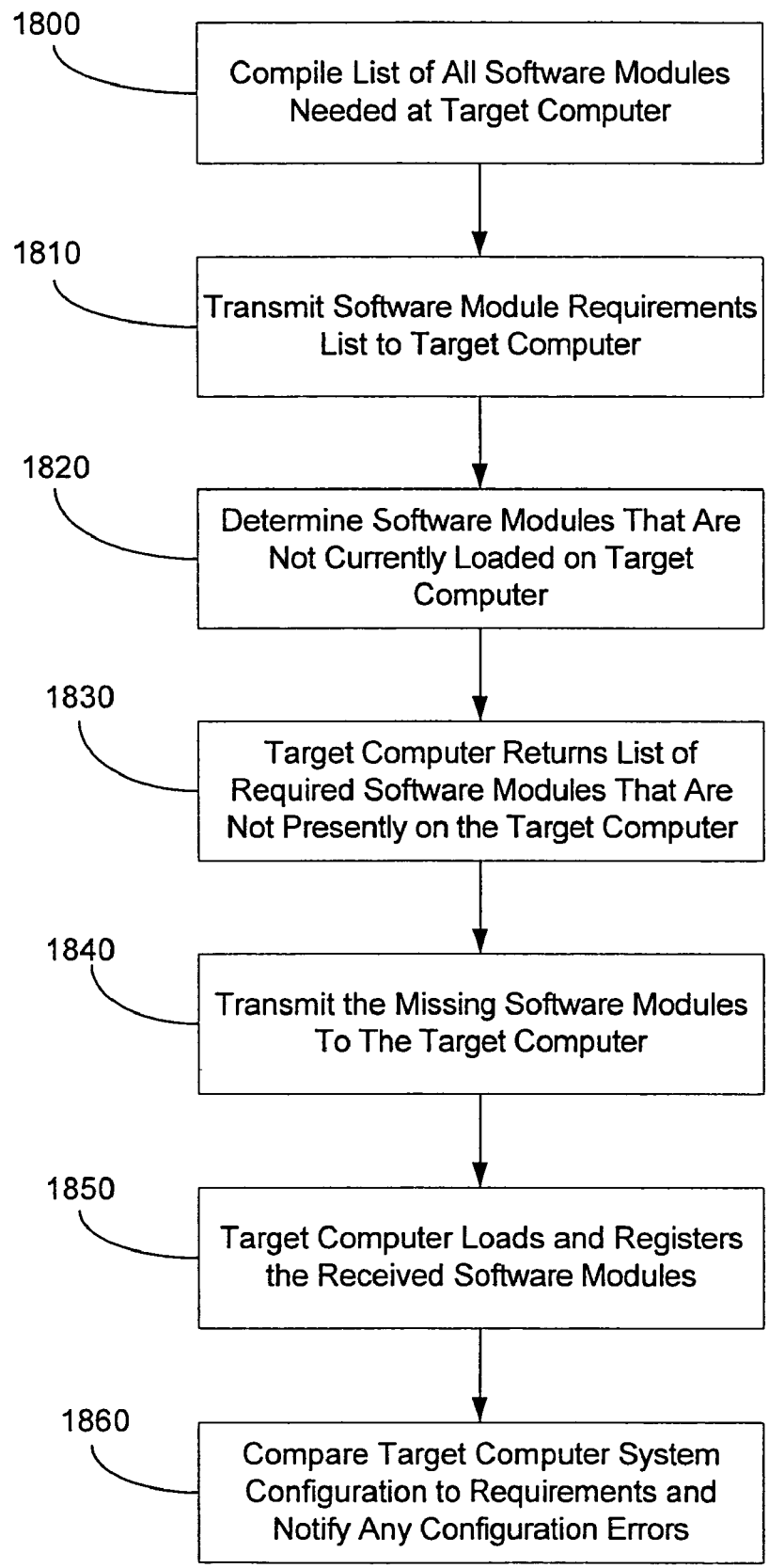
FIG. 18 is a flowchart summarizing the steps for deploying software components to a computer device in a set of computer devices carrying out a distributed supervisory process control and manufacturing information application.

Turning now to FIG. 18, in an embodiment of the invention, loading software onto a remote target computer progresses in the following manner. It is noted that as an initial matter, the computers of the network are generically configured with a base operating system and bootstrap layer that support network communications and basic operational capabilities that facilitate initial loading and start-up and shut-down of the platform layer of the distributed application. Next, during step 1800, a list is compiled of all software referenced by an identified set of objects to be deployed to the target computer. As mentioned hereinabove, each object includes a reference to the software modules (e.g., EXE and DLL files) required by object. Each of these references is traversed and a covering set of module identifications is established. It is noted that the objects themselves identify primitives, which in turn reference software modules. It is therefore necessary to cascade down through all associated sub-components and objects of an identified object to determine all needed software modules. In an embodiment of the invention, step 1800 is carried out by a deployment server executing on a computer (e.g., Configuration PC 120) that also stores a global set of software modules and the objects that reference them in the configuration database 124. Upon completing step 1800, a covering set of all software required to carry out the functionality of the identified set of objects has been created. However, a target computer in many instances already has at least a portion of the supervisory process control application modules identified in the list compiled during step 1800. For example, the target computer may already have the required software modules associated with a platform upon which specialized engines execute. Therefore, the source and target computers cooperatively determine the needed software modules that are not currently present on the remote computer. It is noted that the software modules are separate and distinct from the configuration information that references these software modules.

There are many ways to identify which ones of the needed software modules are not currently present on the target computer. Such variations include executing comparisons on the target computer or alternatively performing a comparison on a computer (e.g., Configuration PC 120) that executes a software deployment server. In an embodiment of the invention, the target computer's bootstrap software includes a method for applying the list of required software modules compiled by the source during step 1800 to the software modules presently loaded on the target computer system. Therefore during step 1810 the source computer transmits a listing of the covering set of required software modules to the target computer in a call to the resident method to determine the ones of the set of listed modules that are not currently present on the target computer.

Next, during step 1820, the target computer determines which ones of the referenced software modules in the transmitted list are not present on its system. In an embodiment of the invention, determining which ones are/aren't present is facilitated by a software module registry maintained by each computer participating in the distributed application. The called method on the target computer determines whether each of the received list of software modules is identified in the software module registry. Alternatively, in the event that such a registry does not exist, the target computer traverses the directory structure for identified software modules. The called method marks the ones in the received required software module list that are not presently loaded on the target computer.

After determining which ones of the software modules are needed by the target computer, during step 1830 the target computer's method generates and transmits a return message to the deployment server (or the caller on the method supported by the target computer) identifying which ones of the required software modules are not present on the target computer. After receiving the return message, at step 1840 the deployment server packages the "needed" software components identified in the return message from the target computer. The deployment server then transmits the software module package to the target computer.

Thereafter, during step 1850 the bootstrap loads the received software components into appropriate directories in the target computer system. The loaded software is also registered within a software component registry maintained by the operating system. At this point the target PC is ready to receive configuration information (e.g., the objects that reference the loaded software components) and start up the engines and application objects making up a portion of the application.

However, in an embodiment of the invention, before loading a configuration, at step 1860 (which can also be performed before step 1800 as a preliminary test before loading any software) a procedure supported by the bootstrap software on the target computer executes a system verification procedure that ensures that the hardware/system configuration of the target platform (e.g., PC) is sufficient to support the loaded modules. By way of example, a platform object may be arranged to execute upon a particular personal computer operating system and hardware configuration. During step 1860 a method on the target computer queries the operating system to determine the actual system configuration of the target computer system. If the operating system or hardware (e.g., CPU type, etc.) are incompatible with the platform object's requirements, then the deployment is blocked and an error message is rendered to the user. The breadth of such checks and the resulting actions are varied in accordance with various embodiments of the invention. In some instances, corrective action can be taken automatically (e.g., loading a communications driver). In other instances the computer hardware must be upgraded or replaced. In some instances a recommendation is issued (e.g., additional RAM recommended), but the deployment and execution of the object(s) is not terminated/blocked.

After installing the needed software modules the configuration information for the objects is deployed. Deploying configuration information to appropriate target computers creates the runtime instances of the objects that define and govern the operations of the distributed supervisory process control and manufacturing information application. Deploying the instances includes activating them in the runtime environment.

Deployment is governed by the hierarchical relationships described herein above. Thus, a host for a particular object is deployed before any of its hosted objects. For example, a platform is deployed prior to deploying any engines on a computer, and an engine is deployed before associated area objects, and an area is deployed before its grouped application objects and other embedded areas are deployed.

Application objects communicate with other objects by specifying actions (e.g., Set and Get) upon named attributes within objects. The general facilitator of such name-based communications is message exchange. Requests to message exchange, by application objects, to perform actions on other objects include identification information enabling message exchange to route messages to objects. This identification information is represented as an MxHandle. An MxHandle is comprised of an MxAutomationObjectHandle and an MxAttributeHandle. The MxAutomationObjectHandle handle includes fields specifying a platform, an engine, and an object with which the deployed object is associated. The MxAttributeHandle handle includes fields uniquely specifying an object primitive with which the attribute is associated and the attribute itself. The Configuration Database 124 includes a global name table 125. The global name table 125 contains a set of subentries for each object that identify each attribute of the object by name (e.g., PV) and a corresponding MxAttributeHandle value. In an embodiment of the invention, properties are statically defined and therefore need not be registered in the global name table 125 when an object performs name binding.

Local message exchange residing on each engine maintains a local name table listing the names and corresponding handles of each object deployed on the engine. The local name table facilitates handling a registration request, for a named object on a same engine as the requestor, rather than going out-of-process to determine a handle. In an embodiment of the invention, when an object is un-deployed, the entry within the name tables maintained by message exchange are cleared.

After a deployed objects' configuration information is sent to the host engine, the object starts up. The startup procedure includes registering the application object with a scheduler object associated with the application object's application engine. In an embodiment of the invention each object is individually issued a scan state request setting the manner in which the object will be periodically handled by the scheduler. After completing the registration and setting the scan state of objects, the attributes are accessible by other objects. By virtue of the local and global name tables and the name resolution capabilities of the engines' embedded message exchange, a target object and its attributes are accessible by objects without regard to the target object's location on one of the multiple computers executing the application with which the target object is associated.

Figure 19:
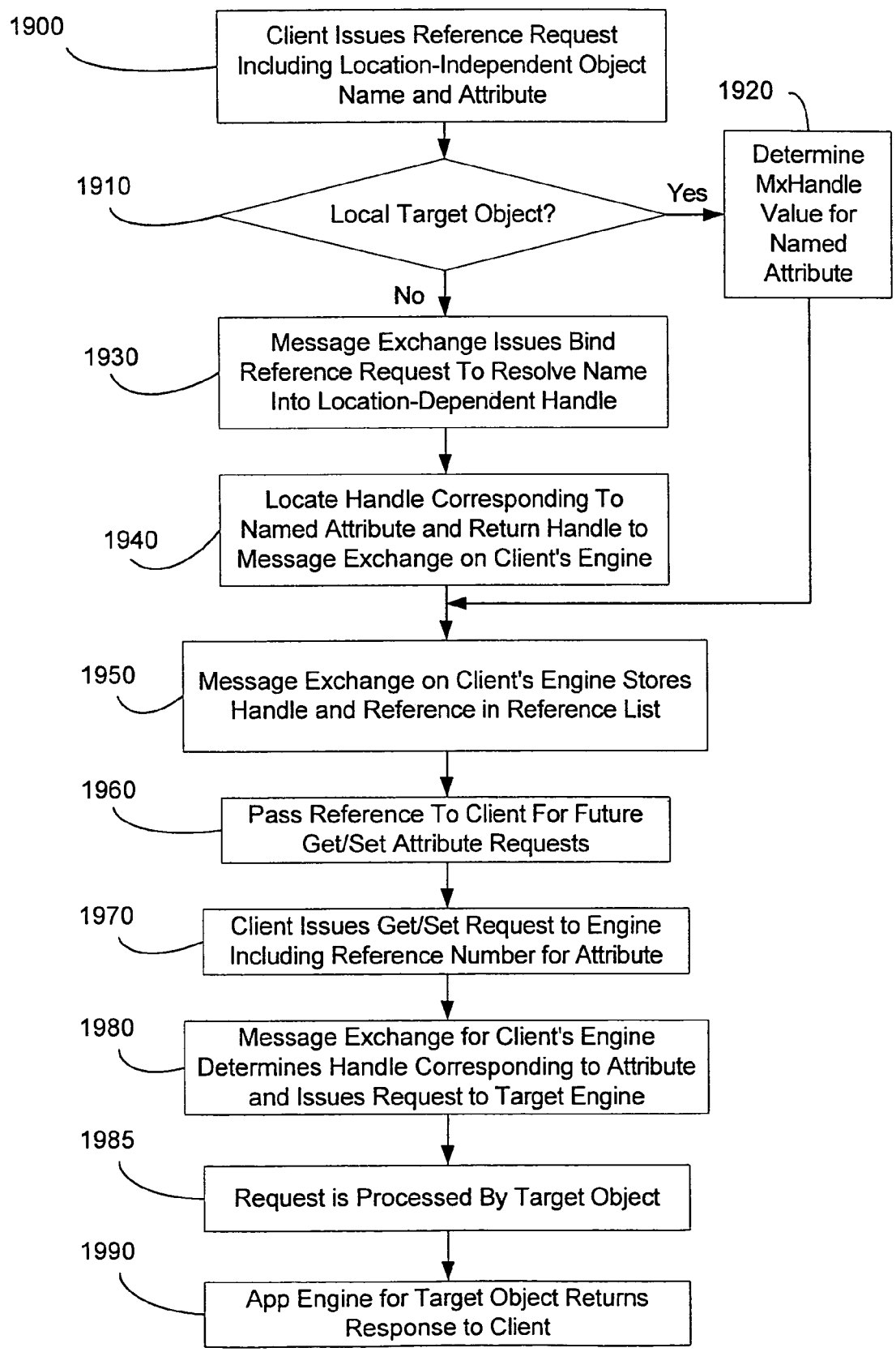
FIG. 19 is a flowchart summarizing the steps for registering a connection to a target object attribute and then submitting commands to the object attribute in accordance with an embodiment of the present invention.

An exemplary sequence of steps depicted in a flowchart depicted in FIG. 19 demonstrates the location transparency of an object with regard to other deployed objects seeking to "get" and "set" attributes on the object via message exchange and underlying inter-process and network communications protocols. Initially, during step 1900 a client1 (e.g., an application object with a dependency upon data rendered by another application object) issues a Register-Reference request that identifies a target object attribute by a location-independent attribute name. An example of such an attribute name is pump1.pv. In an embodiment of the invention inter-object requests are handled via the message exchange facility which exists within the same process as the engine. Thus, the client1 RegisterReference request is directed to the local message exchange on engine1.

After receiving client1's RegisterReference request identifying the pump1.pv attribute, message exchange on engine1 initiates resolving the target object attribute name to a message exchange handle. Thus, at step 1910 the local message exchange on engine1 determines whether the attribute name corresponds to a name in its local name table identifying the objects hosted by the engine1. If the attribute name corresponds to a local attribute, then control passes to step 1920 wherein the local message exchange on engine1 determines the MxHandle value assigned to the object attribute name. Control then passes to step 1950.

On the other hand, if the named attribute does not correspond to a local object, then control passes from step 1910 to step 1930 wherein the message exchange of engine1 issues a BindReference request to the configuration pc platform 126 that maintains the global name table 125 (in the configuration database 124) for the application objects within an application. The BindReference request includes the location-independent name, pump1.pv that the engine1 seeks to resolve into a corresponding MxHandle.

Next, during step 1940 the configuration pc platform 126 locates the name entry in the global name table 125 and returns the corresponding MxHandle for the named pump1.pv attribute to the engine1.

After determining the value of the MxHandle, at step 1950 the engine1 creates an entry in a reference table that includes at least a reference handle (an integer value corresponding to the entry in the reference table corresponding to the name pump1.pv) and the MxHandle value for the named object attribute pump1.pv. In an embodiment of the invention, the attribute name is stored in the reference table entry, thereby allowing other objects to request a reference to pump1.pv, and in response determining an MxHandle without consulting either of the name tables.

In an embodiment of the invention, MxHandles are withheld from the application objects. Instead, during step 1960 the engine1 returns the reference handle (MxReferenceHandle) to the client1. The reference handle corresponds to the reference table entry containing the MxHandle for the referenced object parameter (pump1.pv). In an alternative method, the client1 never receives the MxReferenceHandle, and instead includes the attribute name with each command. The alternative method includes alphabetically reordering the object/attribute names to facilitate quickly locating a reference entry. Alternative ways to shield the MxHandles from clients will be known to those skilled in the art.

After receiving the reference integer value, during step 1970 the client1 issues a get/set command including the MxReferenceHandle integer value provided during step 1960. The command is sequentially removed from the message exchange queue for engine1, and during step 1980 the message exchange retrieves an MxHandle from an entry in the reference table based upon the supplied MxReferenceHandle integer value corresponding to the pump1.pv attribute name. The message exchange on the engine1 forwards the request to the object in the form of a Get/Set attribute command including the MxHandle corresponding to the pump1.pv attribute. The retrieved MxHandle handle provides the needed routing information to forward the request to a proper destination application object. In the case where the get/set attribute command refers to a local, in-process object, the request is handled in-process. Otherwise, the request is handled by a network message exchange (also within the engine1 process space) that processes requests involving objects hosted on other platforms and engines. During step 1985, the pump1 object receives and processes the received get/set command. During step 1990 the pump1 object returns a response to engine1 that originated the request on behalf of the client1, and the client1 receives an appropriate response message based upon the request. In particular the response includes the original MxReferenceHandle provided by the client1 in its request. The response also includes by way of example a piece of data, a reference, a completion status, etc. Once the client1 establishes a reference to a named attribute (e.g., pump1.pv), thereference persiss over subsequent get/set attribute commands. Therefore, steps 1900 through 1960 are executed only once, and thereafter the MxReferenceHandle value for pump1.pv is utilized for subsequent requests by client1.

Figure 20:
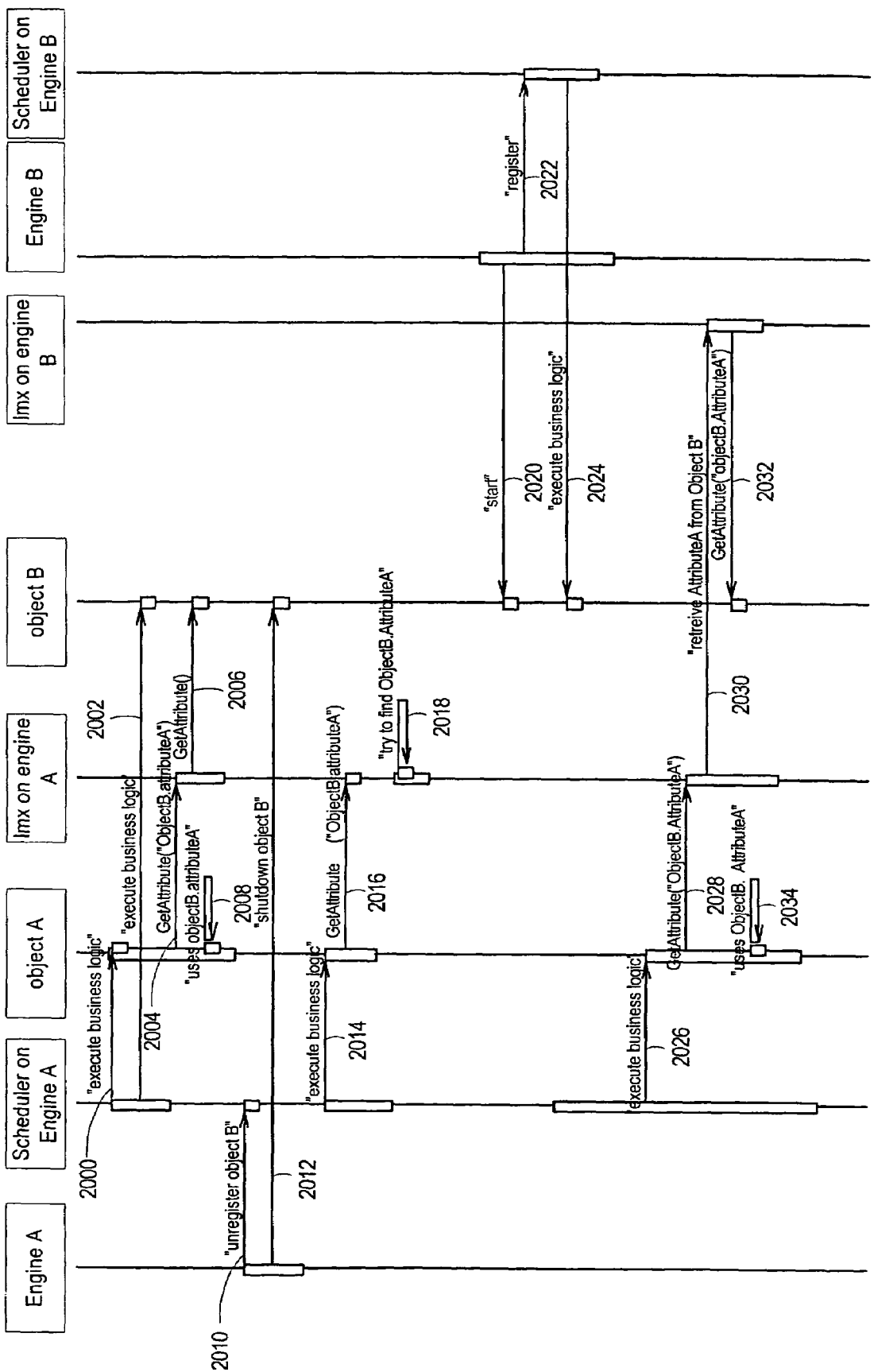
FIG. 20 is a sequence diagram depicting a set of steps associated with maintaining a connection to a referenced target object attribute notwithstanding it re-deployment to a new physical location in a network upon which a distributed application is deployed.

The location transparency is particularly advantageous in the context of relocating objects to other engines on a system. In such case, only engines (that carry out the message exchange functionality) need be concerned with the changed location of an object. The name of the object does not change when an object moves, and therefore application objects that reference a re-deployed object need not perform any procedures to accommodate a location change by the object. The sequence of calls depicted in FIG. 20 demonstrate any exemplary scenario where an object executing on a first engine sends a sequence of GetAttribute commands to a second object on the first engine, the second object is relocated to a second engine, and a new handle is established for the second object on the second engine, and the second object resumes receiving GetAttribute commands from the first object. The example assumes that object A has already established an MxReferenceHandle to an attribute of interest through a RegisterReference command to message exchange on the first engine. The example furthermore assumes that the local message exchange on engine A has previously obtained an MxHandle for attribute A of object B on engine A.

Initially, during step 2000 a scheduler A on engine A activates object A to perform its business logic (programmed function). In this example, object A's programmed function requires it to retrieve (get) a parameter value maintained by object B and utilize the value to perform a calculation (e.g., a feedback loop for setting an inlet valve to establish a particular flow rate from a tank). At step 2002 the scheduler A activates object B to perform its business logic which includes establishing a current value for a parameter retrieved by object A.

During step 2004, object A, in the course of performing its business logic, issues a GetAttribute command including an MxReferenceHandle value corresponding to attribute A on object B (i.e., ObjectB.AttributeA). Local Message Exchange (LMX) on engine A retrieves the GetAttribute command from its LMX queue and during step 2006 passes the request to object B using the previously established MxHandle for ObjectB.AttributeA. At step 2008 object A executes a calculation based upon the data retrieved from ObjectB.AttributeA.

Next, engine A issues an un-register object B command to the scheduler for engine A during step 2010, and a shutdown object B command to object B itself during step 2012, thereby removing the object B from the set of periodically executed objects on engine A.

At step 2014 scheduler A again activates object A to perform its period business logic. At step 2016 object A again issues a GetAttribute ObjectB.AttributeA command to LMX on engine A. During step 2018, the LMX on engine A again issues a GetAttribute using the old MxHandle for ObjectB.AttributeA—unaware that Object B has moved to Engine B. An error message (e.g., InvalidId) is returned to the LMX on engine A. LMX on engine A returns an error message to object A, because of this error object A can not complete the execution of its' business logic.

Object B is relocated to Engine B and a new MxHandle is established in steps 2020 and 2022. The Object B executes under scheduler B's command during step 2024. LMX on engine A issues a BindReference ObjectB.AttributeA call to the ConfiguratonPCPlatform in step 2018. In response the ConfigurationPCPlatform returns the new MxHandle for ObjectB.AttributeA. In an embodiment of the invention, Object A on engine A can now reissue its "get" request successfully without knowing that object B was relocated Engine B.

At step 2026, the scheduler A executes the business logic of object A, and then during step 2028 object A issues a GetAttribute request to LMX on engine A that includes the MxReferenceHandle (for ObjectB.AttributeA) that was established prior to issuing the first GetAttribute command at step 2004. Thus, even though the location of object B changed, the MxReferenceHandle remains the same. The move of object B to engine B is transparent to the requesting object A, and object A continues to use its previously obtained MxReferenceHandle to submit requests to ObjectB.AttributeA. During step 2030 the LMX on engine A forwards the request to an LMX on engine B (object B's new location) using the new MxHandle for the moved ObjectB.AttributeA. At step 2032, the LMX on engine B retrieves the request from its queue and passes the request to object B. The value of ObjectB.AttributeA is returned to object A on engine A via the LMX infrastructure, and during step 2034 object A executes its calculation using the retrieved attribute value.

Figure 21:
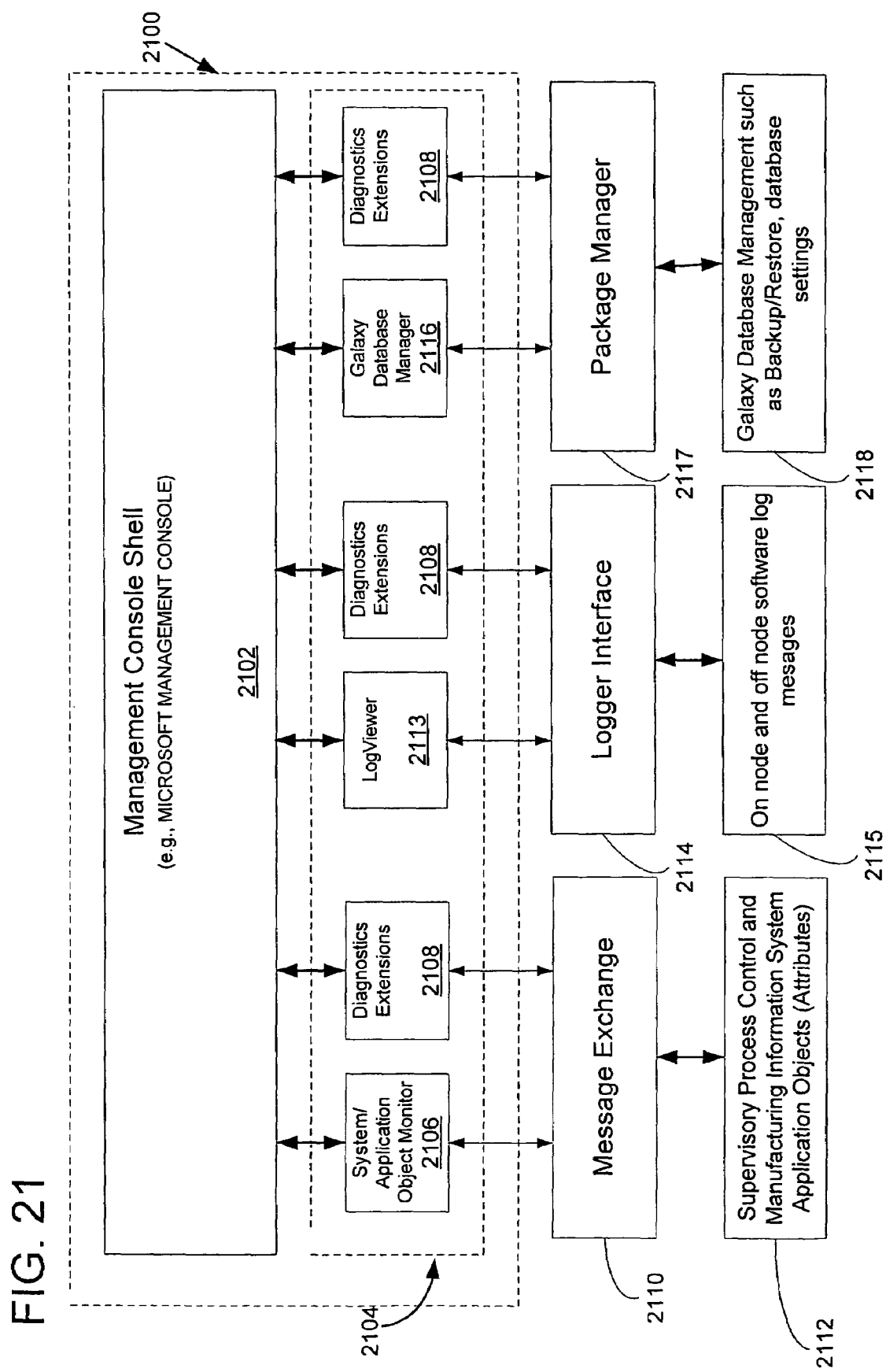
FIG. 21 is a block diagram depicting the primary components of an extensible centralized diagnostic utility for managing the distributed objects of an application.

Once the application has been distributed to the computers, a centralized diagnostics management tool provides an interface facilitating monitoring the distributed components (e.g., platform, application engine, and application objects) of a supervisory process control and manufacturing information application. Turning to FIG. 21, in an embodiment of the invention, the centralized diagnostics management tool, referred to herein as a systems management console (SMC) 2100, comprises a management console shell 2102 such as, for example, the well known MICROSOFT Management Console (MMC). The SMC 2100 is the primary human interface for managing a running process control and manufacturing information application and the source of displayed high and low level diagnostics for the components of the system depicted in FIG. 1. The management console shell 2102 provides a graphical user interface comprising a variety of views depicting an assortment of diagnostic data and commands that users are capable of asserting upon linked objects. A set of such views are depicted by way of example in FIGS. 22–23. The functionality of the SMC 2100 is bi-directional in the sense that it gathers data and status of objects, and issues commands changing data or status of the linked objects. Thus, in addition to displaying retrieved diagnostic information, the SMC 2100 enables a user to select a graphically depicted representation of an object on one of the SMC 2100's supported views and then specify a command or action to be performed upon the selected displayed object.

The capabilities of an exemplary configuration of the SMC 2100 are a superset of the management capabilities of a runtime process view engine, and the set of extended capabilities is open-ended in view of the architecture built around an extensible management console shell. Such capabilities include, for example:

Monitoring error logs generated by platform logging processes. Sorting and filtering the logging is also supported.

Monitoring and tuning-up network and communication performance.

Administering platforms and engines—including shutting down and re-starting the platforms and engines, checkpoint saving, restoring, and monitoring the status and diagnostic data rendered by the engines and platforms.

Administering configuration and history database archiving and backup.

Administering and monitoring I/O servers also known as Data Access Servers (DAServers).

Administering and monitoring licenses.

Adding, deleting, and modifying users based upon user profile templates.

Deploying platforms, engines and application objects in response to failures.

In and embodiment of the invention the SMC 2100 is deployed with the platform object for each computer to ensure that all computers used within a system have access to the SMC 2100's functionality. In an embodiment of the invention, the SMC 2100 is not launched when the platform is deployed. Instead, it is started from a programs option off the Start menu in an MICROSOFT WINDOWS operating system desktop user interface. All snap-ins (e.g., object monitor 2106 and diagnostics extensions 2108, described herein below) are deployed with the platform so that when an update to the SMC 2100 is available, only one re-deployment of the software is required to complete the update. The SMC 2100, for runtime data, uses its platform object as the communications gateway to objects within the rest of the distributed system for purposes of sending and receiving diagnostic/remedial messages. The SMC 2100, for runtime data does not rely on the configuration database 124 for any of its services. Instead the SMC 2100 communicates directly with the various target objects (after their message exchange handles have been provided in response to a naming resolution request).

For some diagnostic data the SMC 2100 utilizes direct interfaces provided on the source software target to ensure that the diagnostic data gathering does not adversely effect the runtime communications performance. For example:

Log file diagnostic messages 2115 are accessed via a direct set of interfaces exposed on the logger interface 2114 as the volume of data would deteriorate the runtime performance if transferred via the attribute subscription method;

Galaxy Database Management 2118 is accessed utilizing direct interfaces package manager 2117.

The SMC 2100 incorporates security to ensure that all monitoring/management operations are invoked by authorized users. If the security permission for a menu item is not provided then the displayed menu item is grayed out for the particular user. If a runtime operation is not permitted then the operation is terminated and a dialog box is raised to indicate that the operation has been denied due to security.

The content of the views and the capabilities of a user to view diagnostic information and issue commands to (e.g., set attributes within) remotely deployed objects are determined in the SMC 2100 by an extensible set of job-specific snap-ins 2104. The set of job-specific snap-ins 2104 supply data and interface control definitions to the management console shell 2102. The management console shell 2102 then presents the data and functions to users via a graphical user interface. Thus, the management console shell 2102 is customized/extended by modifying the set of installed snap-ins 2104.

In an embodiment of the invention, the set of snap-ins 2104 are installed on the management console shell 2102 deployed on a computer. A system/application object monitor 2106 enables the management console shell 2102 to display to a user the objects installed on the system and their status. The information provided by the system/application object monitor 2106 concerns the status of the operating software of the system (e.g., application engines, platforms, application objects, etc.). The object monitor 2106 enables a user, via the management console shell 2102 provided interfaces, to start/stop/re-start any platform or engine. The object monitor 2106 provides information to the management console shell 2102 enabling a user to view performance statistics of platforms and engines. The object monitor 2106 communicates with the distributed supervisory process control and manufacturing information application objects 2112 (e.g., platform objects, engine objects, etc.) via the previously described message exchange communication facilities 2110. The features provided by the object monitor 2106 go beyond those provided by a process monitor that displays the operational status of process variables that indicate the status of a controlled manufacturing process (e.g., pressures, temperatures, flow, etc.). A diagnostics extensions 2108 snap-in includes a communications system (e.g., message exchange) monitor/debugger. Other suitable diagnostics extensions are contemplated to handle virtually any monitoring/management function conceivable for a supervisory process control and manufacturing information system. Such extensions are readily implemented through the extensible interface architecture of the management console shell 2102, which is, by way of example the MICROSOFT management console.

Figure 22:
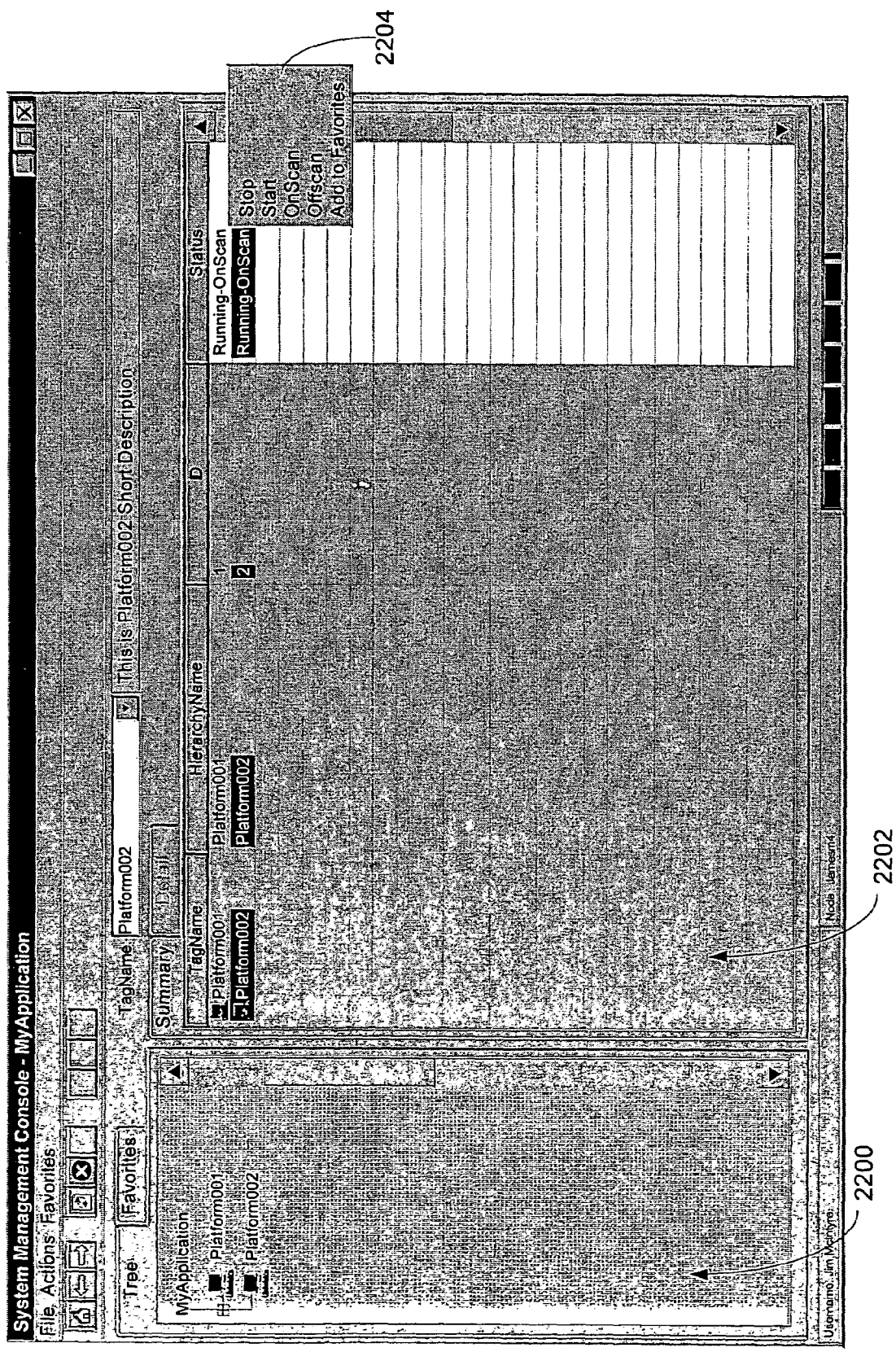
FIG. 22 is a screen shot of an exemplary user interface depicting platforms and their status within a distributed application.

In an embodiment of the invention, the SMC 2100 under the customization influence of one of the snap-ins 2104 exhibits behaviors similar to MICROSOFT's WINDOWS 2000 explorer. Turning to FIG. 22, the SMC 2100 when driven by the object monitor 2106 snap-in, provides a view of the deployed objects in the system. This view is similar to the deployment view available within the IDE and discussed herein above with reference to FIG. 17. The view layout, in accordance with the general MICROSOFT MANAGEMENT CONSOLE conventions and driven by object monitor 2106 snap-in, exhibit the following view behaviors:

1) The left hand pane 2200 displays a tree view of the deployment model.
2) The left hand pane 2200 uses the standard expand and collapse tree indicators to expand or collapse the left hand tree.
3) The right hand pane 2202 indicates the status of a selected object. This contains:
   a) Object Name TagName and HierarchicalName
   b) Object Template Name
   c) Object Status—Started/Stopped/OnScan/OffScan
4) Both views automatically update to changed data (obtained via message exchange)
   a) The refresh frequency is configurable from a pull down menu.
   b) The default is 10 seconds and is configurable down to 1 Sec.
5) On start-up:
   a) The left hand pane 2200 shows the name (e.g., MyApplication) of the system (also referred to as "Galaxy") within which the distributed application operates.
   b) The right pane 2202 contains the platforms (e.g., Platform001 and Platform 002) defined within the global data and the connection status (e.g., Running-OnScan).
6) By either clicking on the expand symbol for the galaxy name or double clicking on the galaxy name in the left hand pane 2200 the tree expands to show the platforms within the left hand pane 2200. This method is available for all objects that have an expansion symbol next to them.
7) By expanding a platform node, a tree of the engines is shown on the left pane 2200 and the right pane 2202 will display the engines' basic states.
8) Selecting an Engine in the left pane 2200 or by double clicking in the right pane 2202 provides a view of all objects that are hosted by the selected engine (e.g., area objects and device integration objects).
9) Areas have an expansion symbol indicating that they host. Application Objects. See, FIG. 23, for an example of an expanded tree and attributes of a selected application object V101(T001.Inlet).

With reference to FIG. 22, in an embodiment of the invention a user is capable of activating a context menu 2204 for each object displayed on the user interface rendered by the SMC 2100. The context menu contains a list of the operations that can be submitted to the selected object. The list on dependent on the user's authenticated security and the object type. Functions that the user does not have permissions for will appear grayed out on the context menu 2204. By way of example, the context menu contains: Start/Stop Platform/Engine—based on the object state; OnScan/OffScan—Based on the Object Status; and Add to Favorites—that saves the object to the favorites view for later viewing. A user may thus designate favorite views to reduce the time involved in traversing the tree structure to reach a desired view of an object or set of objects.

Figure 23:
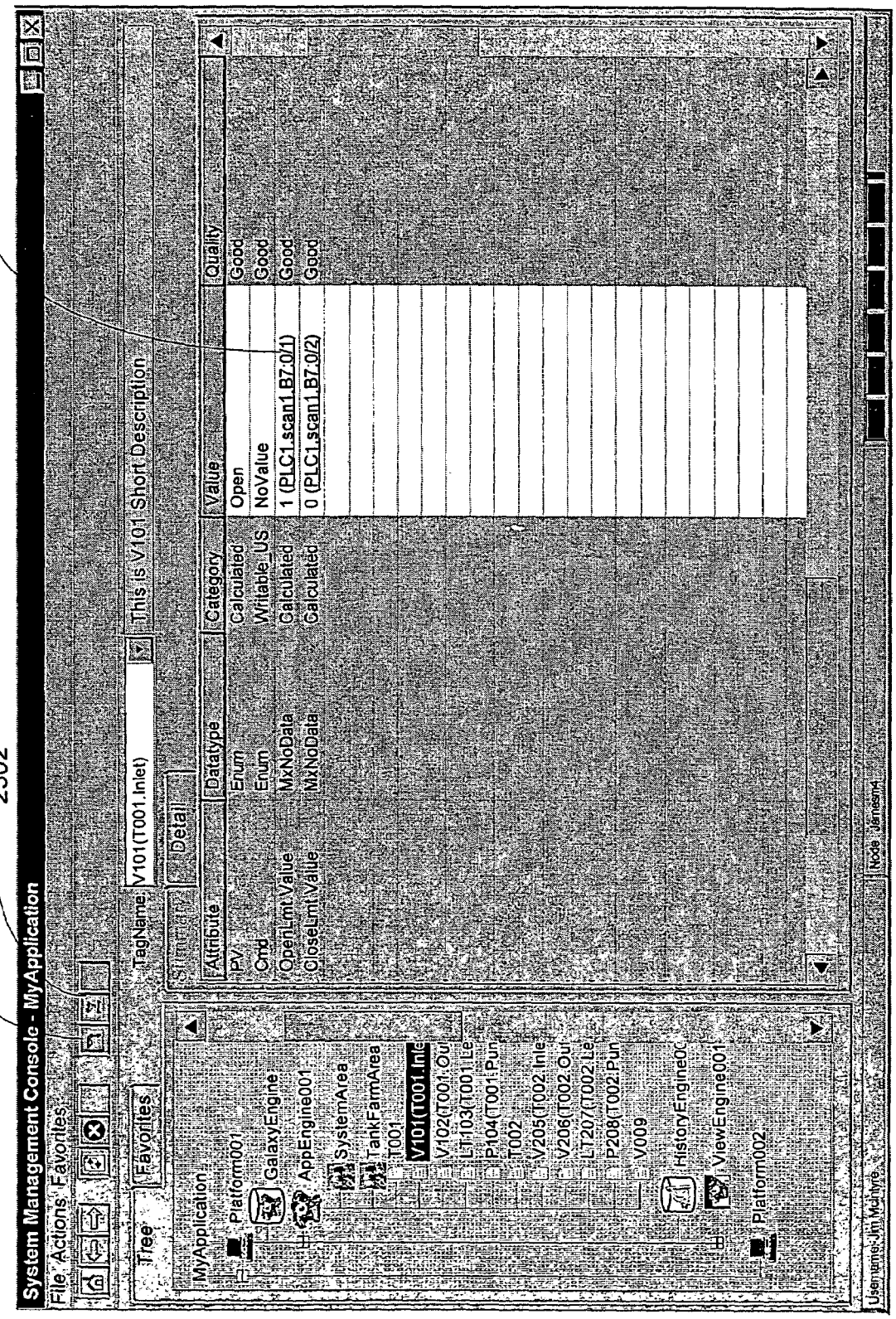
FIG. 23 is a screen shot of an exemplary user interface depicting the fields of attributes for a selected object.

Referring now to FIG. 23, the SMC 2100 provides a detailed grid for viewing object attributes of a selected application object V101 (T001.Inlet). Such objects attribute displays include in general: Name, description and any exposed attributes. Particular types of objects and their exposed attributes include:

Galaxy—Database statistics

Platform—PC information such as OS version

Application Engine—Message Exchange and Scan statistics

View Engine—Display draw and Message statistics

Device Integration Network—Transaction rates & unconnected PLC's

Device Integration Device—Individual PLC transaction and error statistics

With continued reference to FIG. 23, control buttons 2300 and 2302 are supplied to launch sorting and filtering displayed properties in the right hand pane of the display. The user is therefore able to control the content of the displayed columns as well as its order of presentation. As shown in FIG. 23, the value property column of an attribute displays a reference string 2304 for the input/output if applicable. The reference string 2304 acts as a hyperlink so that the user can trace through objects. The ← → buttons act as in MICROSOFT Explorer browser traversing the latest user views.

Furthermore, in an embodiment of the invention the Value property will be write-enabled (possibly via double click or a context action). Thereby not only allowing a user to diagnose a problem, but also take remedial action by specifying a command on an attribute. A dialog is displayed suitable for the data type. The dialog allows a user (if they have the correct security permissions) to write to the attribute. By default the write privilege will be in User mode, however the dialog will provide the user with the capability to do both supervisory and systems writes. Examples of management operations executable via such write commands include: bringing objects onscan/offscan; start/stop engine, setting the alarm mode to enabled/disabled/silenced.

The SMC 2100 can be used as an effective administrative tool for performing a number of high level system control operations. These functions are briefly discussed herein below. One high level task facilitated by the SMC is to perform a platform recovery for a previous breakdown. An administrator selects the platform from the global data list and requests initiates the recovery. In response, the full software re-deployment is carried out from the configuration database 124. If the platform chosen is the local platform then a message is displayed indicating that the selected platform is the one the user is currently logged onto. If the option is to continue then the SMC will be stopped and no indication is given of when the process has been completed.

Another administrative task is to purge all system log files. This task is based on a date entered by the user. All logs will be deleted that have a creation date prior to the supplied date. The user is presented the option to back up the files before deleting.

The Galaxy database manager 2116 from the SMC 2100 provides a mechanism for the user to back-up/restore a single distributed application from the configuration database 124. For Back-up they will be required to:

Enter the GalaxyRepository

Select the Galaxy within the GalaxyRepository

Enter target destination file name for the back-up log

Start the backup process.

The back-up once complete will contain all the configuration and files required to recreate the application configuration into an empty configuration database. The recovery process utilizes the selected backup file to overwrite or create a new application configuration within the configuration database 124. The restore process restores the whole application configuration with the deployment state defined at the point that the application configuration was backed up The SMC 2100 also supports a system software logging utility LogViewer 2113 that enables all system objects and framework software to report operational errors, statistics, etc. that enable technical support or systems engineers to diagnose and remedy software performance problems. The system software logger is the low level logger used by the infrastructure and objects of the system depicted in FIG. 1 to report information that is required by technical support or end user systems engineers attempting to diagnose problems with the software. The system software logger is not the target location for application level logging (stored in the historian). The log maintained by the system software logger is available at all times. In an embodiment of the invention the log is stored in binary file format to ensure that the logging operation has minimal impact on the runtime performance.

The retention policy for logs is configurable. Users can configure the retention period for all of the software log files. The configured policy can be based, for example, upon a number of days or the amount of disk space dedicated to the log files. When the size of the disk space taken is changed form larger to smaller the log information truncates the oldest information. The file format of the log is abstracted from the clients so that as software technology advances the storage format can be changed without causing ripple effects through the rest of the architecture.

Table 1 below sets forth pre-defined log flags for the logger. All log flags are in the off state except for Error, Warning and Info.

TABLE 1

| | |
|---|---|
| Error | Log an error message. Error messages are used to indicate an error condition from which you cannot continue. This indicates a software problem that should not have occurred. |
| Warning | Log a warning message. Warning messages are used to indicate an error condition from which you can continue, but the output may not be what was desired. |
| Info | Log an informational message. Info messages simply describe successful completion of large tasks, or other things that may be of casual interest to the user. This should not be used for frequently logging messages. |
| Trace | Log a generic trace message. Used for detailed messages about the internal operations of a component. |
| Start-Stop | Log that some component has started or stopped. These messages can help in showing when certain processes or objects have been started or shut down. |
| ThreadStart-Stop | Log that a thread has started or stopped. |
| SQL | Log SQL related messages. These messages can be used for tasks such as dumping SQL select strings that are too long to be viewed in the Developer Studio debugger. |
| RefCount | Log object reference counts. This is used mainly for COM object ref counts but can be used for any object that manages its life time by counting its clients. |
| Entry-Exit | Log a function entry/exit message. These messages simply flag that functions have been entered and exited. |
| Connection | Log a connection message. This is used mainly by communication components that manage there connections with clients or servers. |
| Ctor-Dtor | Log a Constructor/Destructor message. |

From an option within the SMC 2100, it will be possible to turn on or off the information messages and debug messages for a specific object or set of objects. This will provide the developer the ability to provide full diagnostics, and turn these functions off at runtime to avoid flooding the logs and degrading the performance of the system.

In an embodiment of the invention, the software developer, for example an ApplicationObject developer, can generate their own log categories and "register" them via the logger interface 2114. This provides the developer a way to quickly isolate their specific log information via the filtering mechanism mentioned herein below.

In an embodiment of the invention, the log file contains:
Software start-up
Software termination reports
  Why the termination occurred (Planned/Failure)
  Failure information if possible
Software information messages
  Security login/logout
  Security infractions
  Connection requests from Internet clients
Debug messages
  Software debug messages used to enable detailed diagnostics of Magellan infrastructure.
  Software debug state changes on->off and off->on In an embodiment of the invention, the following fields will be available:
Platform Name—PC/platform name
Date/Time—File time
Component—IDE, SMC, Object Name
LogFlag Name—Debug, Information, Warning, Error . . .
Message—Description
Source is defined by the Object Model,
Message Identifier and Description are free format In an embodiment of the invention, a logger viewer 2113 facilitates providing a view across all of the log files available on a local platform. Furthermore, the logger viewer functionality is extended to designated non-local platforms as well. The display provides a grid type view onto the log messages. The display refreshes when the user is viewing the latest page of information. If the user has moved off this page by using the [PageUP],[PageDown], [UpArrow],[DownArrow], [Home] Keys or using the Scroll bar then the page is not automatically refreshed. The display also reacts to the scroll wheel available with most new mice. The [End] key returns the user to the latest entry in the log, and therefore restart automatic refresh. The refresh frequency is set dynamically to the refresh frequency of the local client. The refresh frequency persists across restarts of the snap-in of the set of snap-ins 2104 that is responsible for the logging functionality of the SMC 2100.

In an embodiment of the invention it is possible to create a filter on any of the available fields within the log file. This filter will be a simple "and" filter, for example:
Source=AppEngine1 AND LogFlagName=Name AND Description="Dead" The filter is provided by a fill in the gaps style form using where possible selection controls for the well-known columns. Users select the start time to view or all logs entries between two specified times.

Illustrative embodiments of the present invention and certain variations thereof have been provided in the Figures and accompanying written description. The present invention is not intended to be limited to these embodiments. It will be appreciated by those skilled in the art that a new and useful method and application has been described for deploying software and a configuration for a process control and manufacturing information application and thereafter monitoring the deployed distributed application through a general management shell customized to support diagnostic/remedial operations via a set of snap in software modules. In view of the many possible environments to which the principles of this invention may be applied and the flexibility of designing and carrying out software-based systems, it should be recognized that the embodiments described herein are meant to be illustrative and should not be taken as limiting the scope of the invention. Those skilled in the art to which the present invention applies will appreciate that the illustrated embodiments can be modified in arrangement and detail without departing from the spirit of the invention. The present invention is intended to cover the disclosed embodiments as well as others falling within the scope and spirit of the invention to the fullest extent permitted in view of this disclosure and the inventions defined by the claims appended herein below. Therefore, the invention as described herein contemplates all such embodiments as may come within the scope of the following claims and equivalents thereof.

What is claimed is:

1. A supervisory process control and manufacturing information system including:
   a process control and manufacturing information application comprising a set of software objects distributable to a plurality of networked computer devices; and
   a centralized diagnostics management tool facilitating monitoring operational status of the set of software objects of the supervisory process control and manufacturing information application,
   wherein the-process control and manufacturing information application has a layered architecture comprising:
      application objects that model entities within a process control system,
      engine objects that host execution of the application objects in a run-time environment, and
      platform objects, corresponding to a physical computer system component for executing the engine objects and associated application objects, and wherein the platform objects host one or more of the engine objects.

2. The system of claim 1 wherein the centralized diagnostics management tool comprises a set of view templates having controls for manipulating graphically displayed representations of data associated with the set of software objects.

3. The system of claim 2 wherein the set of view templates includes a tree view that is populated by representations of selectable software objects.

4. The system of claim 3 wherein the set of view templates includes a work area populated by exposed attributes of a selected one of the selectable software objects.

5. The system of claim 3 further comprising security measures for limiting access to the selectable software objects.

6. The system of claim 1 wherein the centralized diagnostics management tool comprises an interface customization software interface for integrating an extensible set of software modules providing access to ones of the set of software objects.

7. The system of claim 1 wherein the centralized diagnostics management tool comprises a set of software modules that submit requests to the set of objects to access exposed operational status attributes of the software objects.

8. The system of claim 7 wherein the set of software objects comprises an object corresponding to a physical computer system component.

9. The system of claim 7 wherein the set of software objects comprises an engine object.

10. The system of claim 7 wherein the set of software objects comprises application objects.

11. The system of claim 10 wherein the application objects are distributed across a set of remote computer systems.

12. The system of claim 7 wherein the set of software modules access diagnostic data relating to the operational status of a real time process control information database.

13. The system of claim 7 wherein the set of software modules access diagnostic data relating to the operational status of a data access server.

14. The system of claim 7 wherein the set of software modules provide bi-directional access to the set of software objects.

15. The system of claim 14 wherein the bi-directional access includes issuing commands to the software objects.

16. The system of claim 7 wherein the set of software modules comprise snap-in modules that provide data and interface control definitions for accessing and displaying remotely deployed software objects.

17. The system of claim 1 wherein the engine objects and platform objects address aspects of the application relating to physical computing device configurations upon which the application executes, and wherein the application objects execute independently of the physical computing device configurations.

18. The system of claim 1 wherein the platform objects include a set of attributes for configuring and controlling a set of engines deployed on the platform objects.

19. The system of claim 1 wherein the engine objects include a set of command attributes associated with managing application objects.

* * * * *